United States Patent [19]

Mooers

[11] 3,751,638

[45] Aug. 7, 1973

[54] SIGNALLING SYSTEM

[76] Inventor: Calvin N. Mooers, 13 Bowdoin Street, Cambridge, Mass.

[22] Filed: Apr. 6, 1972

[21] Appl. No.: 241,839

Related U.S. Application Data

[63] Continuation of Ser. No. 36,220, May 11, 1970, abandoned, which is a continuation-in-part of Ser. No. 486,964, Sept. 13, 1965, Pat. No. 3,521,034, which is a continuation-in-part of Ser. No. 392,444, Nov. 16, 1953, abandoned, which is a continuation-in-part of Ser. No. 774,620, Sept. 17, 1947, abandoned.

[52] U.S. Cl. ............ 235/61.6 R, 35/6, 235/61.11 R

[51] Int. Cl. ............................................ G06k 19/00

[58] Field of Search .................... 235/61.6 R, 61.11; 35/6; 340/146.3 R, 348, 149 R, 152 R; 178/50; 209/110

[56] References Cited

UNITED STATES PATENTS

| | | | |
|---|---|---|---|
| 1,862,872 | 6/1932 | Vincent | 35/6 |
| 2,107,008 | 2/1938 | Lasker | 235/61.11 |
| 2,364,446 | 12/1944 | Hubbard | 235/61.11 |
| 2,395,923 | 3/1946 | Van Bernshoter | 172/16.1 |
| 2,417,531 | 3/1947 | Welk | 235/61.11 |
| 2,438,588 | 3/1948 | Tolson | 234/61.11 |
| 2,473,444 | 6/1949 | Rajchman | 235/61.11 |
| 2,558,577 | 6/1951 | Myers | 235/61.11 |
| 2,605,965 | 8/1952 | Shepherd | 340/146.3 R |
| 3,535,450 | 10/1970 | Vollmeyer | 178/50 |

*Primary Examiner*—Thomas A. Robinson
*Attorney*—Dike, Bronstein, Roberts & Cushman

[57] ABSTRACT

The method and apparatus of a signalling system wherein the message output signal is reconstituted from instances of recognition of preassigned groups of signal elements present in the transmission medium, are described. The transmission medium contains a plurality of messages each coded by groups composed of a plurality of discrete transmission signal elements, with the signal elements for different messages being of comparable energy intensity, with the transmission signal elements of the groups being distributed over the transmission parameter domain, and with the possibility of signal elements of some groups corresponding to signal elements of other groups or messages. For reception, a physical representation is formed for each transmission signal element in the transmission medium according to parameter intervals in a domain of a specified set of transmission parameters. To receive a specific message, instances of the presence of preassigned groups of such physical representations are detected where detection of a group is determined by the presence of a specified minimum number of representations, the occurrence of spurious detections of groups being controlled by the number of signal elements in a group and the specific message signal is reconstituted on the basis of instances of detection of said groups.

13 Claims, 8 Drawing Figures

Inventor
Calvin N. Mooers
by Roberts, Cushman & Grover
Att'ys.

INVENTOR.
Calvin N. Mooers
BY Roberts, Cushman & Grover
ATT'YS

SIGNALLING SYSTEM

This is a continuation of application Ser. No. 36,220 filed May 11, 1970, now abandoned, which was in turn a continuation-in-part of application Ser. No. 486,964, filed Sept. 13, 1965, now Pat. No. 3,521,034, which was a continuation-in-part of application Ser. No. 392,444, filed Nov. 16, 1953, which was a continuation-in-part of application Ser. No. 774,620, filed Sept. 17, 1947, both Ser. Nos. 392,444 and 774,620 being now abandoned.

This invention relates generally to message signal systems. More particularly it relates to those systems in which a transmission medium is used to simultaneously transmit a plurality of messages for different reception devices or receiving points, and in which the signal elements for the different messages in the medium are intermixed in regard to their transmission parameters in the transmission medium.

According to the invention, the message output signal for a reception device is reconstituted not on the basis of recognition of individual signal elements, but on the basis of recognition of preassigned groups of signal elements with each group having a plurality of signal elements. The signal transmission parameters of a message are not restricted to exclusive partitions of the transmission parameter domain as in conventional signalling systems, but instead the signal elements of the groups which carry a message are distributed over the domain of a specified set of transmission parameters of the transmission medium.

For reception, a physical representation is formed for each signal element sensed in the transmission medium according to parameter intervals in the domain of the specified set of transmission parameters, which may include frequency, time, amplitude, phase, and the like. To receive a specific message, instances of the presence of predetermined groups of such physical representations are detected, where detection of a group is determined by the presence of a specified minimum number of representations, and the specific message signal is reconstituted on the basis of instances of detection of said groups.

Since many sets of preassigned groups of signal elements can be used, with each set independently carrying its own separate message to some reception device, many messages can be placed in the transmission medium. By choice of the number of signal elements in the preassigned groups, intermessage interference can be controlled. By choice of the particular set of preassigned groups, specific reception devices can be addressed by a transmitting device. Since transmission or recognition of a signal element group replaces the more conventional transmission or recognition of an individual pulse signal of conventional signalling systems, the various well known message-signal-to-pulse transformation techniques, and pulse-recognition-to-output-signal reconstituting methods can be employed or adapted to the signalling method of this invention.

It is an object of this invention to provide a new and improved means of signalling in a channel carrying a multiplicity of messages and to attain this end without the requirement that the signal elements of the various messages be restricted to exclusive partitions of the domain of transmission parameters, such as time, frequency, phase, amplitude, etc., of the transmission medium.

Another object of the invention is to diminish intermessage interference where a multiplicity of messages are impressed in the same unpartitioned transmission medium.

Another object of the invention is to provide a means for selectively addressing any reception device from among a large number of reception devices without the employment of exclusive partitions of the domain of the transmission parameters.

Another object of the invention is to allow a large number of different messages to be impressed into the same transmission medium, with a predictable control of the inter-message interference.

Another object of the invention is to provide for a method of signal element group recognition which can be used together with any of a large number of conventional signal reconstituting techniques for the reception and reconstituting of the output message signal.

Another object of the invention is to provide a method for the selective reception of any one of a multiplicity of message signals in a common transmission medium.

A further object of the invention is to provide a means for efficient utilization of a transmission channel.

This signalling technique, which employs the recognition of groups or patterns of signal elements in a medium, where said medium contains a large number of signal elements not of immediate concern, and which employs an array or matrix representation of the signal elements as marks, is very closely related to my concurrent divisional application for a battery controlled machine (Ser. No. 486,964). This latter system is analogous and is also concerned with the recognition of groups or patterns of marks in a medium (which may be physical record tallies or a continuous strip), where the medium also contains a large number of marks not of immediate concern, and which employs an array or matrix representation of the marks, Accordingly because of the very close relationship between these two inventions, and because the battery controlled machine is in some ways easier to comprehend (since it is more tangible), I shall throughout discuss certain aspects of my invention both in regard to the simpler battery controlled machine, and in regard to the embodiment of the inventive ideas in signalling systems and transmission and reception methods and devices.

In the battery controlled machine, the output is controlled jointly by a battery of previously recorded control parts in the form of physical tallies and by a group of input actuations for preassigned groups of marks. In the analogous signalling aspect, it should be borne in mind that the message signal output is controlled jointly by the transmission medium containing the impressed signal elements and by the preassigned groups of recognized signal elements. Consider the battery controlled machine.

In machines of this type, the control battery often comprises from fifty up to several tens of thousands or more tallies in the form of sheets, sections of film or tape or other media, electrical structures, and other equivalents. The battery may be a permanent integral component of the machine, or it may be separable from the machine. Each tally of the battery is generally a structural part which bears a machine-controlling configuration of marks, digits, or indicia positioned at various sites in a fixed matrix or indicia placement coordinate system. Such a matrix of sites is sometimes called the coding field of the tally. A site can represent only two states: a mark or a blank. The marks recorded in the tallies are of such a nature that mark sensing elements in the machine, which are arrayed at sites in a machine matrix congruent to the tally matrices, can sense or respond to the configuration of marks in each of the tallies in the battery.

The group of input actuations to a machine of this type determines the disposition of the actuated mark sensing elements in the machine, and generally the input is specified as a group of one or more input descriptors from a repertory of descriptors. Some of the machines have an input channel for each of the descriptors in the repertory, and in these machines the actuation of a group of input channels will convert each of the inputs into an appropriate pattern of mark sensing elements. In other forms of battery controlled machines, the input facilities may be lacking or vestigial, and in that case each of the input descriptors is externally converted to an input descriptor pattern and these patterns are then used to determine the disposition of the mark sensing elements of the machine. After conversion of the group of input descriptors to patterns of mark sensing elements, either internally or externally to the machine, the machine examines the marks and blanks in each of the tallies of the battery in accordance with some form of comparison between the input patterns and the configurations of marks in the tallies. The response of the machine after such examination of the tallies can take several forms. Groups of tallies may be segregated from the rest of the battery, individual tallies may be identified or selected, or the tallies responded to may be counted.

The battery controlled machine thus serves to provide input-output relationships between various groups of input descriptors and various groups of responded to tallies, and this process is completely defined or determined by the interactions between the configurations of marks in the tallies and the input patterns supplied to the mark sensing elements. Since the repertory of input descriptors can be in the order of several thousand, and since the battery can contain tens of thousands of tallies, there are an exceedingly large number of possible input groups and output groups, and therefore an even larger number of useful input-output relationships between the groups in a machine of this type. Consequently, the tallies acting as machine control elements bear a great burden in representing by their mark and blank configurations the large number of such relationships in a form capable of controlling a machine. It is one of the objects of this invention to provide a battery of tallies and a machine which permits a larger number of such useful input-output relationships while using a matrix of fewer sites or positions than by previously used tallies, batteries, and machines.

Digital machines of this type and their control battery may take a variety of forms. For instance, the battery of tallies can be a pack of punched cards temporarily placed within a statistical or tabulating machine which is manually wired such that its mark sensing elements are arrayed in the proper input descriptor patterns, and the output of the machine can be a census-type accumulation of counts of those tallies which meet the machine's interrogation. Another variation is the card controlled switching device used in telephone central systems called a translator. The translator has a battery of metal sheet tallies contained permanently within the machine, and it is used to convert the digits of a dialed number (the input descriptors) into the number of a trunking connection (identification of a tally) by which a call to another office can be routed. In another instance, the machine apart from the battery is reduced to a vestigial form, such as several rods as sensing elements fixed in a handle and used manually to sort a battery of tallies in the form of a pack of cards. In the cards, marginal holes (blanks) and notches (marks) constitute the controlling configuration, and the accepted cards drop from the pack and fall off the sorting rods. It is an object of this invention to provide, despite the variety of forms the battery may seem to take, for a greater number of useful input-output relationships while at the same time permitting a corresponding reduction in the complexity of the battery controlled machine.

Some of the most severe problems in the use of battery controlled machines and tallies have arisen in connection with the specific problem of cataloguing collections of scientific information, reports, or other documents so that such documents can be retrieved at will according to various specifications of desired subject matter. Although the present invention is by no means limited to such documentary retrieval applications, this cataloguing problem furnishes an excellent illustration of the advantages of the present invention. By analogy, it will be seen by those skilled in the art that the present improved battery and machine have broad capabilities as a search organ for computing machines, as a switching organ in telephone systems, and generally as a translator from one group of inputs to another of outputs of whatever nature.

Considering now for definiteness the problem of documentary retrieval, we find that each item of information or intelligence, or each report, book, or document, is assigned to or represented by one tally of the battery. It is then the purpose of this tally to be responsive according to a fixed set or group of descriptors associated with the document. For instance, the tally may be responsive to any of say 10 descriptors from the machine repertory totalling 250 descriptors, or responsive to any combination of these 10 descriptors. Typical descriptors in documentary retrieval might have the meanings "lubrication," "aircraft," "engine," etc., each indicative of a useful class of retrieval demands upon the collection of documents. Since the interaction between the battery controlled machine and the battery can only occur as a consequence of the machine's digital behavior with respect to the indicia of marks and blanks in the various tallies, these descriptors each must be given a digital representation in the form of patterns of marks and blanks in the respective tallies. The nature of this scheme of digital representation, conventionally known as the coding system, has a profound effect upon the overall utility and complexity of the machine.

A measure of the difficulty of providing a battery of tallies which can respond adequately to the wide variety of groups of inputs can be derived as follows. If the allowable inputs consist of the presentation of groups of $k$ or fewer descriptors chosen from a repertory totalling V descriptors, the number of input groups exceeds $V^k$. For instance if V has the value of 1,000 and $k$ is 10, the number of possible input groups is $10^{30}$. There may be an even greater variety in the output groups. On the other hand, a tally having a matrix of F sites can represent only one cut of $2^F$ configurations of marks and blanks, and it generally happens that $V^k$ greatly exceeds the tally response capability measured by $2^F$. This situation has generally limited the use of battery controlled machines, particularly in documentary retrieval applications. It is a further object of this invention to circumvent this apparent limitation upon the responsive capabilities of the battery of tallies and the controlled machine.

In the conventional approach to the digital representation of the input-output relations, the matrix of sites of the tallies of the battery is partitioned or subdivided into submatrices or subfields, and a corresponding partitioning is effected among the matrix or array of sensing elements of the machine. Such a submatrix may be a single site, or more generally a group of a number of sites. Any single descriptor input is then represented on a tally or among the machine sensing elements always by a pattern of marks and blanks, or code pattern of indicia, confined entirely to one of the submatrices or subfields. The same fixed submatrix is always used for the same descriptor. If the machine is presented a single descriptor input, then if any tally in the battery bears the identical descriptor input pattern of marks and spaces in the same submatrix, then this tally causes the machine to respond to it by identification, segregation, selection, or in some other way.

Any tally is thus conventionally capable of causing simultaneous response to only as many input descriptors as there are submatrices, since this is the maximum number of non-interfering patterns of marks and blanks that can be represented at one time by the mark sensing elements. With more than one input descriptor given to the machine, a tally causes machine response if and only if the patterns of marks and blanks for each and every input descriptor pattern is separately found in exactly the right submatrix of the rally and there is an exact matching of the several patterns of marks and blanks within these submatrices. The machine cannot accept as an input the simultaneous presentation of two descriptors which have their pattern representation in the same submatrix. This restriction severely limits the utility of a machine using the conventional approach.

By greatly increasing the complexity of the battery controlled machine, it is possible to have the machine compare the pattern of each descriptor input with the patterns within every submatrix of each tally (the submatrices being of equal dimension) and to cause the machine to respond to any tally which has a matching pattern for every input descriptor pattern recorded in some submatrix, whatever the order of occurrence of the submatrix on the tally. Such a machine has very desirable capabilities for useful input-output relationships, but its inherent complexity due to the need for multiple pattern matchings in each of the many submatrices makes it an expensive machine to build. Moreover, it is still limited by difficulties because the desirable input variety measured by $V^k$ is still often far greater than the tally capability measured by $2^F$. Therefore it is an additional object of the present invention to provide a battery controlled machine which is less complex than such a machine while yet having essentially the same capabilities. Another important object is to overcome at the same time the apparent limitations expressed by $2^F$ being smaller than $V^k$.

A method which tends to avoid the difficulties inherent in dividing the tally matrix into submatrices or subfields makes use of a technique of superimposition of descriptor patterns. By the superimposition technique, the pattern of marks representing any single descriptor is laid out over the entire matrix of a tally. If the tally is to be made responsive to two descriptors, the corresponding patterns of marks for the two descriptors are put on the tally in superimposition. By this is meant that the two patterns are combined in the tally matrix as follows: At any site, and for the two patterns, two blanks equals a blank, a mark and a blank equals a mark, and two marks equals a mark. By successive superimposition, the patterns for additional descriptors are added to the tally to give the final configuration of marks and blanks carried on the matrix of that tally.

Upon presentation of one or more input descriptors to the battery controlled machine, with either internal or external conversion to the corresponding descriptor patterns, the several input descriptor patterns are superimposed to give the combined pattern of actuated machine mark sensing elements according to which the machine response to the tallies is determined. Response to an individual tally, or its selection, occurs whenever each actuated mark sensing element of the machine finds a corresponding mark in the matrix of the tally. This response is independent of the occurrence of either marks or blanks at tally sites without an actuated mark sensing element. This kind of response is called pattern inclusion response or selection. For a given input group of descriptors, the output response of the machine with respect to the battery is the identification or selection of no tally, one tally, or of a number of tallies, as the case may be.

Because all the descriptor patterns, both in the machine and the tallies, are defined on the undivided tally matrix, the mark sensing elements of the battery controlled machine need not respond individually to a variety of submatrices when employing the pattern superimposition technique. The machine does not have to test each descriptor input pattern against each submatrix of each tally of the battery. Therefore this technique confers the great advantage of permitting the use of a very simple machine rather than one of great complexity. However, set against this advantage is the fact that with the superimposition of patterns the individual tally patterns and the individual input patterns intermingle, overlap and get mixed up. This confusion of patterns does not prevent the selection or identification of those tallies which should properly be responsive to the input descriptor patterns. Such tallies are selected exactly. On the other hand, superimposition does allow the machine to respond to certain tallies whose descriptors have no connection with the input descriptors, and such extra or spurious responses are due to the fact that response depends only upon the recorded marks and blanks of each tally and does not depend directly upon the descriptors themselves associated with the tally. Extra responses are characteristic of use of the superimposed pattern technique. It is therefore an object of the present invention to provide a battery of tallies using superimposed patterns in which this spurious or extra output response is controllable and is held to a minimum.

The batteries and battery controlled machines constructed according to the technique of superimposition of patterns with pattern inclusion selection have so far failed to secure anywhere near the full advantage of the method because of inappropriate design and construction. That is, the input-output relationships determined by the tallies have been unduly limited in some cases, or an excessive number of erroneous outputs or responses have arisen in others. These shortcomings have been due to failure to provide a battery with the appropriate structural features in the way of the disposition of the machine-controlling marks and blanks in the tallies, and to failure to provide means for the most appropriate representation of the input descriptors in terms of the input patterns of the machine mark sensing elements.

To illustrate these difficulties, a battery of card tallies which responds with an excessive number of erroneous outputs will now be described. For this purpose, the card tallies are assumed to have a matrix of 30 sites divided into three groups of 10 sites each. The sites of each group are numbered from 0 to 9, and the groups are identified as "units," "tens," and "hundreds." A pattern of three marks, one mark in each group, thus represents any number from 000 to 999. Such patterns are associated with the input descriptors in the following general way. The battery is for documentary retrieval in which different types of aircraft make up one group of input descriptors, i.e., DC–3, DC–4, 4F4–U, 4F4–F etc. for some 20 or more types of aircraft. These descriptors are given serially patterns 000, 001, 002, etc. respectively until the aircraft types have been used up. Next the ship types (as descriptors) are assigned to the following successive number patterns, and so on. There is therefore a generally sequential assignment of related items or descriptors of a class to the number patterns, though the assignment is not altogether regular or continuous. Two aircraft may have patterns 012 and 017, and there is only one mark between the two patterns which distinguishes them. Such a single-mark distinction is very likely to be obliterated when additional patterns are superimposed in a tally matrix containing either one of these patterns. Consequently there is a very poor distinguishability of the tallies according to any pattern coming from such a sequence. Thus the output errors in tally selection are excessive because tallies which are not intended to be responsive to descriptors in the input group, will be frequently and erroneously selected. The fault in such a battery of tallies is an unduly high degree of correlation or similarity between the individual descriptor patterns within related groups and also between the total tally mark configurations in the tallies of the battery. Such a high correlation of the marks in the battery tends to destroy a great deal of the useful input-output capability that the battery should have for a given number of matrix sites. Therefore it is still another object of the present invention to provide a battery in which there is the very least possible correlation or similarity of this type, and a battery which therefore achieves the greatest accuracy of output in a battery controlled machine using superimposed patterns.

Another illustration of difficulty is a battery of tallies in which the input-output relationships have been unduly limited through improper use of the sites in the matrix. In this example the first four letters of an English word are used to spell out the pattern of marks, with a matrix divided into four submatrices of 26 sites each, each site being alphabetically designated. However, the matrix sites are very poorly used because letters such as K or Z occur infrequently, while letters E or S occur very often. Consequently, whatever input descriptors a tally is supposed to respond to, sites K or Z will seldom bear marks, while E and S will almost always bear marks. In either case, such sites then have little utility in determining the output response. The effective number of matrix sites, where the effectiveness is measured by ability to control the output response, is accordingly diminished by the number of such over-used or under-used sites, and the input-output ability of the battery is unduly decreased. Therefore it is an additional object of the present invention to provide a battery in which neither over-use nor under-use of the matrix sites of the tallies occur, but in which the burden of representation is uniformly distributed over the matrix sites.

In the signalling system of my invention, there is a transmission medium or channel containing a plurality of messages where the signal elements for the different messages are composed of discrete elements of undulatory signal energy or of other discrete physical manifestation in a medium. The signal elements may be elements of Hertzian electromagnetic energy in a medium such as the atmosphere or in a wired transmission line, or may be elements of vibratory mechanical energy in an acoustic medium, or other forms of undulatory signalling, or other forms of signalling with collectives of discrete signal elements such as voltage signals on a medium of multiple conductors or marks on a record medium.

In signal media of this sort, the signal elements impressed in the medium can be sensed or received and processed or transformed with regard to one or more of the applicable transmission parameters such as time, frequency, amplitude, phase, voltage, etc., so that the signal elements which are qualitatively different with respect to these parameters are separably discriminable. Thus, by a wave filter, a signal element may be transformed or processed with regard to discrimination according to the frequency parameter so that its signal energy passes into only one frequency interval or band of an array of separate frequency intervals or bands. Similarly, by a tapped transmission delay line, a signal element may be transformed or processed with regard to discrimination according to the time parameter (with regard to some fiducial instant) so that its signal energy is concentrated at the location of one of the taps corresponding to one time interval of an array of discriminable time intervals for the whole delay line.

These two illustrative methods of discriminative processing or transformation can be used jointly or together, with a first separation according to intervals of the frequency parameter, followed by (for each frequency interval) a separation according to the intervals of the time parameter. Other technically available transmission parameters may also be used for separation in analogous fashion, either singly, or in combination with any of the others.

Accordingly, in the class of signalling systems of concern here, a certain specified set of signal transmission parameters (one or more) is used, and whatever set is employed, the individual signal elements have a discrete representation in the terms of an interval for each of the applicable signal parameters. These parameter intervals are representable in an array or a matrix which will be linear or one-dimensional if there is only one parameter of separation, or will be twodimensional (or of higher dimensionality) for two parameters (or for more than two parameters) of separation. In such a matrix or array representation, each signal element will therefore be representable by one point or site in such an array or matrix. Thus, the result of physical reception, transformation, and processing of signal elements from a transmission medium will be a representation by a physical signal or mark at a site in the matrix for each discriminable signal element, where the individual sites in the matrix are physically embodied by signal-carrying or signal-holding elements (such as wires, capacitors, or the like) and a market site corresponds to a signal element discriminated or found to be present, and a blank site corresponds to no signal element.

The matrix representing the signal elements will extend over only a particular range of values of the parameters in use. For frequency, there are usually upper and lower limits of the bands, for time, there is usually a period of acceptance epitomized by the length of the delay lines or other separation device used. Such a range of values of the parameters specify the transmission parameter domain in use, and the domain of the transmission parameters represented by the matrix.

In the transmission device, there is a corresponding matrix or array representation of the parameter intervals of the specified set of transmission parameters, with the various sites to be used having signal element generator means which generate signal elements upon activation which have transmission parameters as specified by the particular matrix site. Such signal element generator means are of the conventional sort, such as oscillators for signal elements within a specified frequency interval, or taps on a delay line for signal elements of a timed pulse nature. And so on. In transmission, the output of such signal element generating means, as they are generated, are gathered and impressed in the transmission medium according to conventional techniques.

In the past, the view has been that where a plurality of messages are impressed in a single transmission medium, and where the signal elements for the different messages are of comparable energy intensity, then it is necessary to seek ways in which interference between individual signal elements from the different messages did not occur, or was minimized. In general, this has been done through a variety of schemes for effectively partitioning the array of discriminable intervals, i.e., by partitioning the matrix, so that each message in the medium had its signal elements coming from only a single partition or area of the matrix. For example, the frequency spectrum would be partitioned into frequency bands, with the signal elements for each simultaneous message for a different destination being allocated to an exclusive partition for that message. Similarly, synchronous time division partitioning is used, with different messages being represented by signal elements (or pulses) which are restricted to an exclusive time partition characteristic of each message. Other modes of partitioning, and combinations thereof, are also used. By partitioning in this manner, the signal elements for the different elements cannot overlap or interfere with one another. Thus the presence of a plurality of messages in the signal transmission medium does not result in the individual signal elements of one of the messages from interfering and destroying the effect of the signal elements from the other messages.

However, in practice, such a requirement for partitioning imposes a number of limitations, difficulties, or constraints. One limitation is that the maximum number of simultaneous messages that the transmission medium can handle is limited by the number of available partitions. Another difficulty comes from the frequent desire to provide each receiving point or device with its own partition, so that each reception point can be separately addressed. Another limitation comes from the fact that, for maximum protection against inter-message interference, each partition must be large. Therefore, the number of exclusive partitions must be kept small. In pulse systems, another disadvantage comes from the fact that although time division is a natural mode of partitioning, the use of synchronous partitioning results in many difficulties due to varying time delays, especially if there are a variety of lengths of signal path. Consequently, mutually exclusive partitions may not be easily possible. The present invention obviates or removes these various constraints or difficulties.

In the past, it was necessary to depend upon such exclusive partitioning of the matrix of signal parameters because the basic discrimination upon which the message output signal was reconstituted or reconstructed was the discrimination or recognition of an individual signal element. These individual signal elements, as they were recognized in the transmission medium, were then taken individually as the basic input or actuation to the message output signal reconstituting means, of whatever kind that was. If interference or overlapping of signal elements from several messages happened to cause the false recognition of a single signal element, then there was accordingly a serious deterioration or mutilation of the resulting message output signal. Unfortunately, a transmission medium cannot be used at all heavily without partitioning before an unacceptably high incidence of interference between individual signal elements occurs, thereby giving an unacceptably high level of corruption of the message output signal.

In the signalling method of this invention, the fundamental discrimination upon which the message output signal is reconstituted or reconstructed is not the recognition of a single signal element, but the recognition of preassigned groups of signal elements at each of the receiving devices or receiving points. Each such group or pattern of signal elements is defined by a representation of marks in a group of assigned sites in the parameter matrix, with each group containing a plurality of marks or signal elements distributed over the matrix. A particular receiving device is adjusted so that its mark sensing means are responsive to one or more such preassigned groups of marks. Detection of a group is based upon the determination by the mark sensing means that a specified number of marks of the group are found in the matrix. The message output signal is then reconstituted on the basis of the instances of detection of groups, where detection of a group is based upon the determination that there are a specified minimal number of marks from the group in the matrix.

Following the same principle, the transmission signal which the transmission device impresses into the transmission medium as the basis of transmission is not a single signal element, but one or another group from a set of preassigned groups of signal elements. These signal elements are impressed into the transmission medium irrespective of whatever other signal elements may already be in the medium. By use of the same preassigned groups of signal elements in both the transmission device and the reception device, the reception device will be responsive to the transmission device.

When the fundamental discrimination is a group of signal elements, according to this invention, then the overlapping of signal elements, or their interference one with another in the signal medium, is not only permissible, but in a properly designed system permits a system with some unusual advantages and features. Since recognition is now based upon a group of signal elements, rather than a single element, a number of advantageous statistical properties of group recognition prevail, and these properties make the recognition of a group much less susceptible to error than for recognition of single elements. Because the groups will ordinarily have the transmission parameters of the signal elements distributed across the entire range of the applicable domain of the transmission parameters represented by the matrix, the groups do not depend upon partitioning of the matrix for providing the separation between the different messages in the transmission medium. The separation is a consequence of statistical unlikelihood of an unduly high incidence of erroneous recognitions of other signal element groups.

In signal systems of the kind to which this invention is applicable, the message signal which is transmitted typically consists of either voice or picture signals of an analog nature, or of digital coded signals such as are used in telegraphy or digital data transmission. In the digital coded cases, the digital impulses are themselves taken as the actuations for the following transmission step in the practice of the invention. In the analog signal cases, such as for voice transmission, the actuations needed for the next step must be formed by any of a number of input signal transformation techniques well known in the art of pulse transmission. For example, the instantaneous amplitude of the voice signal may be represented by the recurrence rate of a standard pulse actuation, or two pulse actuations of opposite polarity may be used in sequence where actuations of one polarity indicate an increasing instantaneous amplitude of the voice signal, and actuations of the other polarity a decreasing amplitude. In another way, the amplitude or other characteristic of the signal may be coded into a binary digital numerical representation according to a set of different actuation pulses, with each actuation indicating by its presence a numerical place-value of some power of two, giving the pulse code method of message signal transformation. In each case, the message signal is transformed into a representation by actuations, where there may be only one kind of an actuation, or there may be a set of a number of different kinds of actuations, with the transformation providing several different actuations at each instant from the set.

It is understood that in any of the methods mentioned for the transformation of the message signal into actuations, there is also an inverse of the transformation, whereby through the use of a similar set of actuations at the reception apparatus, it is possible to reconstruct or reconstitute a message output signal which is a usable replica of the original input message signal. These steps of initial transformation into a group of actuations from a set of actuations, and reconstitution of a replica output message signal from a corresponding group of actuations are part of standard technology, and are not part of this invention.

In practice of the method of the invention, each of the different actuations is associated with an assigned group of a plurality of signal elements, where the transmission parameters of the individual signal elements of a typical group are distributed or scattered in a pattern over the whole area of the representation matrix for the signal elements. The number N of signal elements in a group is chosen so that the expected level of spurious selections at the reception point is satisfactorily small. The manner of choice of N will be described later. Typically, a transmission or reception apparatus is arranged so that at will it can be conditioned to associate different preassigned sets of groups of signal elements with the actuations typical of the method of signal transformation of the transmitter.

In operation, the transmitting apparatus accepts a message signal and in a conventional manner performs a transformation to actuations. These actuations are taken from the set of actuations characteristic of the method of transformation. According to the invention, each of said actuations from the message transformation causes its assigned group of signal elements to be generated and to be impressed into the transmission medium. That is, if the parameter domain is the time parameter alone, each actuation results in the generation and transmission of a pulse group. If the parameter domain is the frequency domain alone, each actuation results in the generation and transmission of a plurality of energetic signal elements in the bands corresponding to the assigned group. Similarly in the case when other signal and transmission parameters are used together, or with other combinations of parameters.

It is characteristic of this invention that the signal elements are impressed into the transmission medium, which typically contains a plurality of other messages, irrespective of the other signal elements that may already be in the transmission medium. This results in some of the individual signal elements corresponding to, or overlapping or duplicating other signal elements in the medium, but this is expected, and is compensated for according to the method of the invention.

At the reception point, the reception device employs conventional methods for sensing or extracting signal elements from the transmission medium. By appropriate conventional means, such as by wave band filters for the frequency parameter, or by tapped delay lines or their equivalent for the time parameter, or by other appropriate means for other parameters that may be used, the reception device transforms or processes the signal elements taken from the transmission medium and represents them in a local physical representation such as by a mark or voltage at sites in a representation matrix. This representation matrix at the reception device is identical in regard to its parameter values to the representation matrix at the transmitting device. Such local representations may be dynamic according to electrical signals or voltages on a conductor, or static according to a recorded state or mark in a magnetic material, a flip-flop circuit, or by other means. The local physical representation may in fact be upon a local medium, such as a magnetic sheet medium or optical medium, with this medium bearing the marks being brought into relation and transported with respect to a local coordinate reference which constitutes the reception matrix.

Prior to reception of a message, the reception device is conditioned with respect to the same assigned set of groups of signal elements which are used at the transmitter for transmission of the message through the transmission medium. As a result of this conditioning, mark sensing means of the reception device are arranged so that each of the signal elements of the assigned groups of signal elements may be individually detected as a consequence of the presence of marks in the representation matrix for signal elements extracted from the transmission medium. Detection of a particular group is based upon the determination that a specified minimal number of marks in the matrix are present. If the particular group as N marks (corresponding to N signal elements), in some situations the specified minimal number will be N, meaning that all the marks of a group must be found to be present in the representation by the mark sensing means. In other instances, the specified number may be set to a smaller number, such as N−1.

At the reception device, detection of a particular assigned group from the preassigned set of groups then provides a physical output actuation characteristic of the detected signal element group. Moreover, this output actuation is in accordance with the same association between assigned groups of signal elements and actuations which is used at the transmission device. Since more than one group at a time may be transmitted and detected, more than one actuation at the output may occur. These output actuations in the reception device are then presented to the signal reconstituting means, which performs a transformation which is functionally the inverse of the transformation made on the input message signal at the transmitting device. The signal reconstituting means therefore produces an output message signal which is a usable replica of the input message signal.

Ordinarily the set of preassigned groups will have a representation in the matrix which consists of marks for each group scattered across the domain of the matrix, with each group being totally different in pattern. In another manner of practicing the signalling invention, the groups of any preassigned set are the same in their pattern representation on the matrix with the exception that each group differs from its neighbor by having all its marks different from the neighbor by a certain increment of one of the signal parameters, i.e., by a "variable" parameter. Thus, in a system with a time parameter, the various groups of a preassigned set would be the same excepting for a systematic shift from a synchronous fiducial time epoch. In this case the variable parameter is a variable time increment. In other cases, the various groups may differ in a frequency shift of each of the signal elements of a group, or by having variable amplitudes or phases, etc. In such systems, with such a linear variable parameter, it is convenient to use a transformation at the transmitter in which amplitudes of a voice signal, for instance, are represented by corresponding proportional values of the linear variable parameter of the preassigned signal elements. At the reception device, signal reconstitution is very simple, with this parameter then being used directly to provide the amplitude of the message output signal. This method is merely a special case of the more general method of signal transmission previously described.

In the signalling system according to this invention, the optimum use of the transmission medium will occur when the medium, as observed from the number of marks formed in a representation matrix at a reception device, is filled with enough signal elements from all the multiplicity of messages so that approximately 50 percent of the matrix sites are marked that is, with the density of signal elements of the medium of 0.5. If the medium carries fewer messages, with an average fewer number of sites being marked, then the medium is not being loaded to optimum efficiency. If appreciably more messages are impressed into a medium already filled to the 50 percent level, then the spurious selections at the various reception devices will tend to rise in an undesirable rapid fashion.

The optimum occupancy ratio for the transmission medium can be characterized in terms of the number of sites in the representation matrix for the discriminable intervals of parameters of the transmission parameter domain. If the matrix has a totality of F sites, and if each of the multiplicity of transmission devices is impressing into the medium on the average of $k$ groups of N signal elements per group from each matrix, and there are T such transmission devices, then the optimum or maximal desirable use of the transmission medium occurs when $k\mathrm{NT} = 0.69$ I. In other words, optimum use of the transmission medium occurs when in effect some 19 percent of the generated signal elements are impressed on top of other signal elements in the transmission medium.

From knowledge of the occupancy ratio of the medium for optimum use, namely the occupancy ratio of 0.50 sites on the average being marked at any one instant, it is possible to provide design information for specifying the number N of marks or signal elements to be used in a typical group of signal elements.

Each of the conventional signal transformation and reconstitution methods which may be used is typified by a characteristic threshold of an unacceptable or undesirable degree of corruption or mutilation of the actuations which are detected at the reception device. Actuations will in general be spuriously added, due to the overlapping or coincidence of two or more signal elements in the same matrix site, either from different groups of the same message, or from different messages from different transmission devices. In some modes of transmission in the medium, it is possible for destructive interference to occur, with the resulting disappearance of a signal element, and thus the impossibility of detection of all of the signal elements of its group. In any case, if the mutilation, as indicated by missing or spurious actuations, is above a certain threshold value, the reconstituted message output signal will be considered to be an unsatisfactory replica of the input message signal as it was presented to the transmission device. The problem is how to hold such mutilations below this threshold level. According to the invention, this can be done by design adjustment of the number N of signal elements in a group.

The threshold value for the maximum tolerable error can be represented by the numeric ratio E, where E represents the ratio of the average number of spurious or erroneous actuations of a group as compared to the total number of times the group is used in a message. The ratio E will be some small number, characteristic of the transformation method employed, and may typically be in the range of 0.1 to 0.01 or even smaller.

According to the method this invention, the number of signal elements in a groups can now be specified so that the spurious responses and errors in the actuations will be in a tolerable range. In those cases in which the detection of a group is based upon the presence of a mark for each signal element for each of the N signal elements of a group, the ratio of spurious selections is found to be $(1/2)^N$. By selection of a suitable integer value for N, corresponding to the number of signal elements to be used in a group, the ratio of spurious selections in an optimally utilized transmission medium may be set smaller than the desired threshold ratio E. For example, with a threshold value of E=0.01, the integer value of N=7 gives the required number of marks in a group.

When detection of a group is based upon the presence of N−1 marks for each group of N signal elements, as in the case where destructive interference may occur, the corresponding ratio of spurious selections is given by $N(1/2)^{N-1}$. With detection based on the presence of N-J marks, the ratio is approximated by:

$$[N(N-1)(N-2)\ldots(N-J+1)(1/2)^{N-J}]/[(1)(2)(3)\ldots(J)]$$

Again, by the choice of value of N, this ratio may be made smaller than the ratio E. For example, with the same value of E=0.01, and with detection based on N−1 marks, the integer value N=10 gives the required number of marks in a group.

According to a principal aspect of the invention, a battery for machine control has marks and blanks at sites in a plurality of matrices of sites, each matrix having F sites, all of said matrices being congruent, marks in each matrix being capable of controlling a machine with respect to a matrix group of machine controlling patterns of marks, each matrix having marks in at least every site corresponding to the marks of each pattern of the matrix group of controlling patterns without any matrix site being restricted to only one controlling pattern, the number of marks in a matrix varying for matrices in a battery, each matrix having sites marked according to more than one pattern; and, over the entire battery of matrices, the number of times $n(i)$ that the $i^{th}$ matrix site is marked being a number which is substantially of the same magnitude for all the F matrix sites, with $n(i)$ being approximated by $\Sigma_i n(i)/F$, and with none of the $n(i)$ having a value in the neighborhood of zero. In an important embodiment, the frequency distribution P(G′;F, N# [kN&kN]) applies to pairs of tallies from the battery with each tally of a pair being machine controlling with respect to $k$+1 patterns, with one pattern being the same for both allies of a pair, and with G′ being the number of sites at which there are matching marks in the two tallies of a pair. In a further embodiment, the battery has a medium bearing the machine controlling marks, and fiducial marks standing in fixed relationship to each of the matrices, the sits of some matrices overlapping the sites of other matrices, with a mark at an overlapping site if at least one of the matrices overlapped bears a mark at that site from one of its controlling patterns, the number of patterns in a matrix group being one or more, and the number of controlling patterns in each matrix group and the degree of overlapping of the matrices being such that the fraction of resulting marked sites on the medium does not greatly exceed one-half, the medium being in a practical embodiment a transparent film with opaque spots for marks, graphic material being recorded on the medium in fixed relationship to each of the fiducial marks.

According to another principal aspect of the invention, a machine of the above outlined type which comprises a plurality of input channels; input actuation means for the actuation of the input channels; mark sensing means arranged in a matrix of F sites; unidirection actuation linkages from said input channels to said mark sensing means to actuate those mark sensing means which are linked to an actuated input channel; each mark sensing means having approximately the same number of linkages, and without any mark sensing means being linked to only one input channel, for typical pairs of input channels with respectively $N_1$ and $N_2$ linkages the number G of mark sensing means being linked by either channel having the frequency distribution P(G;F,$N_1$# $N_2$); a machine control battery having marks and blanks at sites in a plurality of matrices of the battery, the battery matrices being congruent to the mark sensing matrix; application means for applying battery marks and blanks to the mark sensing means with a registration of matrices; and response means to indicate the occurrence of a mark in each and every site of a battery matrix corresponding to a site of an actuated mark sensing means. In such a machine the battery can be a medium with marks and blanks recorded thereon, having fiducial sites in the medium in fixed spacial relationship to each of the battery matrices with every fiducial site in the medium being marked, having a fiducial mark sensing means in the same spacial relationship to the matrix of mark sensing means; the application means traversing the marks and blanks past the matrix of mark sensing means and machine response requiring the simultaneous occurrence of a mark in a battery matrix at every site defined by the actuated and the fiducial mark sensing means. In a further important embodiment, such a machine is divided into a local part and a remote part, having a recording means at the local part for recording marks and fiducial marks on the local medium prior to traversal past the matrix of mark sensing means, having a remote medium with marks and fiducial marks, a reading means at the remote part for reading the marks and fiducial marks on the remote medium; and such a machine has a transmission means connecting said remote reading means with said local recording means.

According to an additional important aspect, the invention provides a collection of units of a medium, each unit having a multiposition field, each position of said field being capable of bearing a single indicium, said field being capable of receiving a plurality of patterns of indicia, each pattern having indicia ranging over said field, a plurality of said patterns of indicia being applied in superimposition to said field of each of said units, and said patterns over the entire collection of units being such that a pattern applied to any unit is either identical to or is scattered with respect to each of the other patterns in the collection. In such a collection of units of a medium each of the said patterns can be associated with a component idea, and for any typical classification grouping by meaning of said component ideas the associated patterns in the respective groupings can be statistically random.

In a further aspect, the above characterized method may be applied to the transmission of signals, either by way of transmittal of a field pattern or by transmittal of a selector pattern.

In an additional aspect related to the continuation-in-part subject matter, signalling systems according to the invention with a transmission medium containing signal elements of a plurality of messages, is characterized by transmission apparatus having message signal transforming means to transform a message signal into actuations from a set of actuations to represent the message signal; signal element generator means to generate discrete signal elements whose transmission parameters are represented by sites in a transmission matrix, where sites in said transmission matrix correspond to intervals of parameters of a specified transmission parameter domain; activation means for responding to said actuations from said message signal transforming means and for causing for each actuation a preassigned group of signal element generator means to generate signal elements, with each group being associated with a specific actuation, with each group having a plurality of signal element generating means, and with the sites of the signal generating means for each group being distributed over the transmission matrix; signal impressing means for impressing said generated signal elements into said transmission medium irrespective of any other signal elements in the medium from other messages; the said transmission apparatus being capable of cooperating with reception apparatus having extraction means for sensing signal elements in said specified transmission parameter domain of the medium; representation means for physically representing signal elements with marks at sites in a reception matrix, with said sites corresponding to intervals of parameters of said specified transmission parameter domain, with the sites of the reception matrix and the sites of the transmission matrix representing the same transmission parameter intervals; signal element transformation means for transforming said sensed signal elements and for forming representative physical marks at sites in said reception matrix; mark sensing means for sensing sites in said reception matrix; for predetermined groups of marks, with the sites of said predetermined groups corresponding to the sites of said preassigned groups of signal element generator means; detection means with said mark sensing means for detecting the presence of any of said predetermined groups of marks, with the instance of detection of a group being based upon the determination that there are a specified minimum number of said formed marks at sites in the reception matrix for the detected group, with the set of instances of detection of the predetermined groups of marks corresponding to the set of actuations of groups of signal generating means at the transmission apparatus; and reconstituting means for reconstituting an output message signal from said instances of detection with the reconstituting means performing a transformation which is the functional inverse of the transformation of the message signal transforming means.

Apparatus of the above type is capable of carrying out methods which are characterized by conditioning a transmission apparatus for generation of a particular set of groups of signal elements, with each group having a plurality of signal elements, with the transmission parameters of the individual signal elements from each group being distributed over a set of intervals of a specified transmission parameter domain of the transmission medium, and with each group of signal elements corresponding to one actuation of a set of actuations in the transmission apparatus; transforming a message signal into actuations from said set of actuations to represent the message signal; generating and impressing into the medium signal elements from groups corresponding to the actuations representative to said message signal, irrespective of any other signal elements in the medium from other messages or groups; conditioning a reception apparatus for said particular set of groups of signal elements; forming at the reception apparatus a physical representation for each signal element in the medium in the specified transmission parameter domain for all the messages, with said physical representation being formed according to said set of intervals of said domain; detecting the instances of presence of groups from said particular set of groups, where detection of a group is based upon the determination that there are a specified minimal number of said formed physical representations for each detected group; and reconstituting a message output signal from said instances of group detection.

These and other objects and aspects of the invention will appear from the herein presented outline of its principles, its mode of operation and its practical possibilities together with a description of several typical embodiments illustrating its novel characteristics. These refer to drawings wherein FIG. 1 is a schematical representation of the general type of battery controlled machine according to the invention;

FIG. 1*a*, 1*b*, and 1*c* are schematic axonometric representations of the detailed constructions of a mechanical embodiment of a machine of the general type of FIG. 1;

THE GENERAL BATTERY CONTROLLED MACHINE

Figures 1, 1A, 1B, 1C, 2:
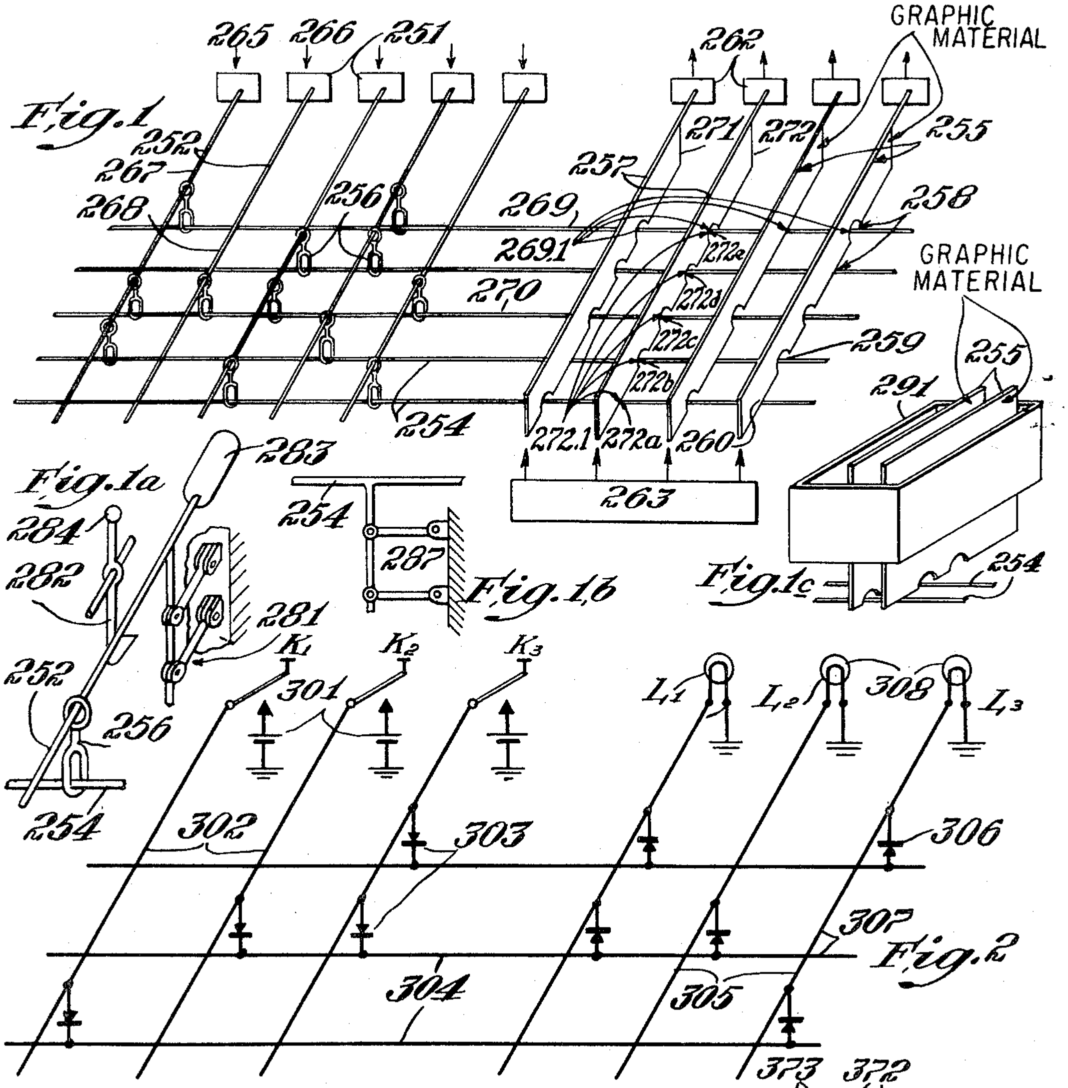
FIG. 2 is a schematic representation of an electrical version of a machine of the general type of FIG. 1.

The general type of battery controlled machine to which the present invention applies is shown schematically in FIG. 1. The operation of such a machine, its battery and its tallies will first be discussed without reference to specific modifications and arrangements that constitute the improvements of the present invention, since the invention itself is characterized in detail in the following section "Embodiment of Invention." A schematic representation of a typical machine has been used in FIG. 1 in order clearly to show the over-all essentials of such a battery and machine and yet to avoid the confusing details abounding in machines of this type.

There are a set of input actuation means 251 which are each connected to input channels 252. There are as many input channels as there are descriptors in the repertory of descriptor inputs and each input channel stands for one descriptor. The actuation of a channel indicates that its particular descriptor has been presented as an input to the the machine. The set of mark sensing elements or means 254 of the machine mediate between the batter 255 consisting of tallies 257 and the input channels 252. Unidirectional linkages 256 at certain points of intersection between the input channels and the mark sensing means transmit at these points the input actuations from the input channels to the linked mark sensing means. The linkages 256 have the property that the actuation is transmitted only from the input channels to the sensing means, and not in the opposite direction. The several linkages for one input channel determine the input pattern of marks for that channel, and therefore the pattern for the descriptor associated with that input channel. Because of the unidirectional action of the linkages, when several input channels are actuated, the pattern of mark sensing means that is actuated is the superimposed pattern of marks from all the actuated input channels.

The sites 258 of the tallies are the locations where the mark sensing means intersect the tallies, and therefore the set of these sites upon each tally is the tally matrix 272.1 of sites **272*a*, 272*b*, 272*c*, 272*d* and 272*e*. The matrices of sites for all the tallies are congruent to each other, and by definition are also congruent to the matrix of the mark sensing means. Each site of every matrix is thus congruent to, or in correspondence with, a site on each of the other matrices. Such corresponding sites as 269.1 intersect the same mark sensing means. Because there are F sites in any matrix, there are F sets of such corresponding sites. A site of a tally can bear either a mark 259 or a blank 260. If a tally 257 causes the machine to respond such as the response of tally 272 according to the tally's pattern 272*a*, 272*b*, 272*e****;* pattern **272*b*, 272*c*, 272*e****;* and pattern 272c; then such response provides a machine output through the output means 262. Manipulating means 263 brings the tallies of the battery to the mark sensing means 254, bringing either one tally after another from the battery in succession, or bringing the entire battery of tallies in parallel to the mark sensing means.

The input to such a machine consists of a group of one or more descriptors presented to the machine, with a consequent actuation of the corresponding input channels 252. The machine output consists of the identification of, or the selection of, a group of tallies by the machine with an indication through the output means 262. For example, in operation if a specific group of input descriptors 265 and 266 are presented to the input means 251, input channels 267 and 266 are actuated. Through the linkages the sensing means 269 and 270 are actuated in turn. Since the machine response to a particular tally occurs when the tally has a mark in each site intersected by an actuated mark sensing means, irrespective of any tally marks or blanks in other sides, the group of output tallies that are responded to are tallies 271 and 272. Machine response is indicated through the output means 262. This type of tally response to the mark sensing means is called pattern inclusion response or selection. It is seen that the responding group of tallies may have many members, one member, or no member, depending upon the group of input descriptors and upon the configurations of marks in the tallies of the battery.

An example of a battery controlled machine of this general type has rods 252 for input channels disposed in parallel in a horizontal plane, with the rods movable vertically for a short distance above their normal resting plane. The input means 251 for each input channel rod includes a parallel motion means 281 (FIG. **1*a*) and a latch 282 to hold its rod horizontally in the raised or actuated position, a handle 283 at the end of the rod so that it can be manually gripped for raising. A release 284 is provided to drop the rod to its normal position. The mark sensing means 254 are also rods disposed in parallel in a horizontal plane below the input channel rods guided by a parallel motion 287 as shown in FIG. 1*b*. The mark sensing rods are also capable of vertical movement above their resting plane. The linkages 256 are wire loops which lift any mark sensing rod which is linked to a raised input channel rod. The linkages are unidirectional because the loops are elongated so as not to prevent the upward movement of any sensing rod whenever at least one of the linked input channel rods is raised. The tallies are a sheet material such as cardboard with notches at sites in the bottom edge for marks and with no notches at the blank sites. The battery is a pack 255 of such card tallies. The manipulating means 263 is a box 291 (FIG. 1*c*) to hold the battery of cards upright and so their sites are properly in register against the actuated mark sensing rods. The manipulating means includes provision for supplying an agitation or some other force to enable the various card tallies to move relative to each other in response to the mark sensing rods. Since response is by pattern inclusion, those card tallies of the battery whose pattern of notch marks includes the pattern of actuated sensing rods will drop by gravity for a small distance below the other cards in the pack, the drop being a distance equal to the depth of the notches in the card tallies. The rest of the card tallies will be supported by at least one sensing rod. Because the responding cards are thus displaced by a fixed distance from the non-responding cards in the battery, the selected cards by their own displacement in the pack indicate the machine response and thus provide automatically for the function of the output indicating means 262.**

Other equivalent machine structures employing electrical, optical, or other operating means will be apparent from this description of those skilled in the art; and in the subsequent section "Electrical and Optical Machines," certain versions of such machines will be particularly described.

EMBODIMENT OF THE INVENTION

The embodiment of the present invention is a machine and battery of the kind shown in FIG. 1 which is so modified and restricted that the physical structure of the machine in the way of linkages and tally marks has the set of characteristics enumerated and explained below. These physical structural characteristics define the invention. A battery controlled machine not having these physical characteristics will not have the desirable features which are the objects of the present invention. However, because of the nature of these structural characteristics, they in themselves give few clues as to how one should actually go about constructing a machine and battery to secure them. For this reason the process for constructing such a machine and battery is described in detail in the section "Best Mode for Carrying Out the Invention." The enumerated characteristics of the machine and battery do not depend in any way upon some specific code, index, or pattern list giving a particular disposition of linkages or marks denoting the intelligence or descriptors; nor do they depend upon any specific manner of identification or designation of the individual sites such as by numbers or letter. As a matter of fact, each time a machine or battery is constructed according to the invention, a different set of patterns or codes may be used, yet each time the machine and battery will have the physical structural characteristics which define the invention and which are listed here.

The various mathematical expressions used in the following discussion are explained completely in the subsequent "Mathematical Section."

Looking now to the machine structure, the first physical characteristic of the invention is:

1. Each of the F mark sensing means in the machine is coupled by essentially the same number of linkages to input channels, no mark sensing means is linked to only one input channel, and where there are V input channels and a total of L links in the machine the frequency distribution of the number of linkages per sensing means has a mean value of L/F and a standard deviation of $(L/F - L^2/VF^2)^{1/2}$.

This structural feature of the battery controlled machine directly provides that the machine sensing load is uniformly distributed over the F mark sensing means, and indirectly provides that the sites in the battery will be neither systematically over nor under marked. By such an even distribution of the load on both the mark sensing means and the tally sites, the maximum possible input-output capability for a limited number of matrix sites is given to the machine and battery.

2. If the machine is actuated by typical pairs of input descriptors having input patterns of respectively $N_1$ and $N_2$ marks per pattern, the distribution of the number G of actuated mark sensing means is given by the expression $P(G;F,N_1 \# N_2)$, and in the case where there are $k$ input patterns each of N marks the distribution of actuated mark sensing means is $P(G;F,kN)$.

This second physical characteristic of the machine provides that the input descriptor patterns, even those of sequential or related descriptors, do not have a systematic similarity of patterns, nor can the patterns occur in a numerical sequence or run. This second characteristic also precludes any deleterious systematic over use or under use of the sensing means sites.

Turning now more particularly to the battery of tallies for machine control, there are these physical characteristics:

3. In a battery having B tally matrices the number of times $n(i)$ that the $i^{th}$ matrix site marked in the battery is a number which is of substantially the same magnitude for all the F matrix sites with $n(i)$ being approximated by $\Sigma_i n(i)/F$ and with none of the $n(i)$ having a value in the neighborhood of zero.
4. In a battery wherein the empirical frequency distribution of the number of tally matrices having G sites marked is R(G), the values of $n(i)$ are approximated by $\Sigma_G(G/F)R(G)$.

These structural characteristics of the battery assure the full usage of the sites in the battery matrix by their requirement for a uniform distribution of the marking load across the various sites. These characteristics consequently preclude non-use, under-use or over-use of any of the tally sites. Characteristics 3 and 4 are very general, and they include the case in which (such as with a continuous battery marking medium) the tally matrices overlap. When such matrix overlapping does occur, any mark occurring in more than one matrix is counted separately for each of the matrix sites or for each of the matrices wherein it appears.

Restricting our attention now to tallies with nonoverlapping matrices, these characteristics prevail:

5. For any typical group of tallies, each responsive to $k$ (but not to $k+1$) descriptor patterns of N marks each, the frequency distribution of the number G of marks per tally is given by $P(G;F,kN)$ and the average number of marks per tally is approximated by $F(1 - e^{-kN/F})$.
6. The average number of marked sites per tally does not greatly exceed F/2, and optimum utilization of the tallies in the battery occurs at F/2.

Characteristic 5 describes the load of the number of marks that a typical tally will carry, and it specifically insured that the tally marks will be so distributed or disposed that a maximum utilization of the F tally sites will be secured. Characteristic 6 further describes the level of optimum utilization of the tally matrix.

A correlation or similarity between descriptor input patterns will destroy the high utility of the battery, so consequently:

7. For typical pairs of tallies from the battery wherein the tallies of each pair are responsive to $k+1$ patterns of N marks each, of which some pattern is the same for both tallies of the pair, the frequency distribution of the number G of marks at matching sites in the two tallies is given by $P(G;F,N \# (kN\&kN))$.

This characteristic specifies explicitly the level of allowable correlation between the patterns in the tallies, and only when such correlation shown by matching marks is consistently sufficiently low for any typical groups of such pairs of tallies will the battery have the full input-output capabilities according to the invention.

The battery controlled machine of the invention would have small utility if it were not possible to control and to predict the incidence of the occurrence of the spurious or extra tally responses. The physical characteristics of the machine and battery jointly which describe and determine the extra response is the following:

8. In a battery controlled machine presented with $k$ descriptor inputs each corresponding to a pattern of N marks, and with a battery having R(G) tallies having G marks each, the expected number E of extra responses is given by:

$$E=\sum_M \sum_x \sum_y P(M;\, FkN)J(F-M;\, F,\, x,\, y) \quad P(F-x;\, F,\, kN)R(F-y),$$

and for a machine and battery of B tallies constructed according to the invention the average value of E is less than $B(1/2)^{kN}$.

Like the others, this characteristic 8 also requires a lack of correlation or similarity of patterns and a uniform usage of the tally sites.

There is a close relationship between capability for input-output relationships of the battery controlled machine and the size of the matrix that is competent to handle these relationships. By the practice of this invention, the most efficient possible use is made of the matrix consistent with a specified maximal rate of spurious response for a battery of a given size. Therefore, given a statement of the input-output capabilities and of the rate of spurious response, the minimal allowable size of the matrix is a very definite characteristic of the battery and machine according to:

9. In a battery controlled machine with B tallies and responsive to as many as $k_2$ descriptor inputs, and when responsive to as few as $k_1$ descriptor inputs not producing more than an average of E spurious or extra tallies, the number of sites F in the matrix of the battery and machine the matrix is $k_2(\log_2 e)$ times the least integer which is equal to or greater than the quantity $(1/k_1)\log_2(B/E)$.

Since the complexity and size of a battery controlled machine depends to a great extent upon the magnitude of F, characteristic 9 can be said to specify the size of the machine for a given input-output capability.

Characteristics 8 and 9 describe the intimate dependence of the two parts of the machine upon each other wherein they both mutually contribute to produce the single advantageous result of tally response in a machine with maximal input-output relationships, minimal number of extra responses E, all by the smallest and simplest machine described by F.

Thus the embodiment of the present invention is a machine and battery of the general kind schematicized in FIG. 1 wherein the decisive structural features giving the machine its performance—namely the linkages and tally marks—have these nine definite physical characteristics. Furthermore, these characteristics deal with features which can be explicitly determined in any battery or machine because they involve or specify actual numbers of machine elements such as the number of linkages per sensing means, marks per tally, number of sensing means F, and so on. The kind of conformity that exists between certain of these mathematically-stated numerical characteristics and any actual battery and machine constructed according to my invention is one of statistical conformity. By this I mean that for actual machines and batteries so constructed various measured values of the machine will fluctuate slightly above or below certain of the precise numbers given, such as the numbers specified by characteristics 1, 2, 5, 7 and 8. These very small statistical deviations are expected, and for actual machines or batteries these deviations become smaller to the vanishing for larger machines or batteries with greater input-output capability. Because these characteristics are statistical in nature, the testing of a machine or battery against them to see whether these characteristics are met is properly done by using the statistically appropriate test procedure in each case. As is well known in the statistical art, distributions such as in characteristics 1, 2, 5 and 7 can be tested for conformity by the chisquared test for goodness of fit, or average values such as in characteristics 1, 5 and 8 can be tested by Student's test. Characteristics 3, 4, 6 and 9 require no special test procedure. Therefore, in the sense well recognized in modern industrial statistics, these nine characteristics fully and exactly describe the necessary physical structure of the machine and battery of this invention.

BEST MODE OR PROCEDURE FOR CARRYING OUT THE INVENTION

The detailed enumeration of the structural characteristics defining the invention contained in the last section do not, however, give directly a prescription for constructing a battery and a machine which will have these characteristics. Therefore this section describes the best mode or procedure that I have devised for carrying out my invention by the construction of such a battery and machine. It is to be understood that the invention is not limited to any single procedure of construction, since a number of alternative ways can be devised which will in the end produce a battery and machine having the necessary structural characteristics listed in the last section and defined in the appended claims.

In the battery controlled machine each descriptor input channel must be linked to one or more of the F mark sensing means. The pattern of such linkages of each descriptor, where the pattern is defined across the sites of the F mark sensing means, is the descriptor input pattern. In order that any tally of the battery be responsive to this descriptor input, the tally must have marks in its matrix at every tally site corresponding to the site of a linkage in the descriptor input pattern. Because each tally will in general be responsive to a plurality of descriptors, the tally must have all those sites of its matrix marked which correspond to the superimposition of the several patterns of this plurality of response-causing descriptors. This totality of marks in any tally is called the configuration of marks of the tally.

According to the best mode that I have found for carrying my invention into practice, I produce the pattern of description input linkages for each descriptor by chosing by lot N sites out of the matrix of F sites of the mark sensing means. For each descriptor in turn, I carry out such a choice of sites. I may sometimes use other patterns provided such other patterns are well scattered and uncorrelated as will be described. The assignment of a pattern to each descriptor is carried out once and for all for each of the V input descriptors of the input repertory of the machine.

When this assignment has been done, each tally of the battery is marked at various sites in its matrix which are the superimposition of the patterns for the several descriptors to which the tally must respond during machine operation. That is to say, each tally matrix has a matrix group of machine controlling patterns with one pattern for each descriptor. Each such matrix is then marked in at least every site corresponding to the marks of each pattern of that matrix group of patterns. Since every matrix is to respond to more than one descriptor, every matrix has sites marked according to more than one pattern.

The specific patterns for any descriptor, or the entire list of specific patterns which happen to be assigned to all the various descriptors, are of no importance whatsoever to the successful construction of the battery and machine of this invention. The entire set of assignment might even be cancelled and a completely new assignment of patterns be given in the same manner to all the descriptors (with corresponding modification of the linkages and sites of tally marks) and the machine will again be operative and will have the necessary physical structural characteristics listed in the last section and described in the claims.

Although the specific descriptor patterns are not of any concern so long as they are of the above character, it is important to use patterns which have an appropriate number of marks or linkages. In many instances all the descriptors will be associated with machine patterns of the same number of linkages. When this is true, the number describing the pattern length will be designated by N. In other cases, a variable number of places in the patterns will be used, and the $i^{th}$ descriptor will have $N_i$ marks in its pattern.

These considerations of descriptor pattern length lead directly to matters of the overall design of the battery and machine in terms of the performance to be attained. Battery and machine performance is specified by the following parameters: The number V of descriptors in the input repertory of the machine; the number B of tallies in the battery; the minimal number $k_1$ of descriptors that will generally be presented as input to the machine; the maximum number $k_2$ of descriptors to which any tally shall respond; and the number E of spurious or extra tally responses which must not be exceeded in the average. From these parameters the necessary number of machine and battery matrix sites F needed to secure this order of performance is equal to $k_2(\log_2 e)$ times the least integer equal to or greater than the quantity $(1/k_1)\log_2 B/E$. Most generally all the descriptors take patterns of equal length, and then the number of marks per descriptor N is given by $0.69F/k_2$.

Turning now to a more precise definition of the patterns I prefer to use for the purposes of this invention, I say that a set of well scattered uncorrelated patterns of N places defined over a matrix of F sites is a set of patterns such as is obtained by placing in an urn F balls numbered from 1 to F but otherwise identical; by thoroughly mixing the balls, by drawing out N balls in a group and noting their numbers (to produce the first pattern); by replacing the balls, mixing again, and drawing a second group of N balls and noting their numbers (giving the second pattern); and so on for as many patterns as are needed. It is seen that with adequate attention to the details of using identical balls and with thorough mixing, the patterns so drawn will be individually well scattered over the F sites and that successive patterns will have a low correlation or similarity.

In some cases, it may be convenient to have patterns which have a definite number of marks—or one mark—in each subdivision of the matrix. In that case, appropriate patterns can be obtained by having as many urns as there are subdivisions numbering the balls in each urn according to the number of places in the corresponding subdivision, and then carrying out the mixing and drawing in the same general fashion from the several urns.

The present invention can also be practiced by using patterns derived in other ways, such as by deriving them from published tales of statistical random sampling numbers (for example the table by L. H. C. Tippett, "Random Sampling Numbers," Tracts for Computers XV, Cambridge University Press, 1927).

The invention can also be successfully practiced with patterns derived in other ways than those described above. The criteria for the degree of acceptability of such other patterns is the degree to which they will lead to a battery and machine with physical characteristics of the kind specified in the section "Embodiment of Invention," and in particular the characteristics numbered 1 through 5 and 7 through 9. These characteristics specify or depend upon equal frequency of use of each of the sites, and a lack of undue correlation between the marks of the various patterns. Examples of acceptable patterns are patterns drawn from an urn with slightly imperfect mixing; urn patterns wherein a pattern is discarded if any one of the numbers repeats a number in the immediately preceding pattern; patterns formed from a numerical translation of certain letter pairs derived from the English word for the descriptor; pattern lists derived by jumbling certain types of number progressions; and so forth. The use of such patterns is acceptable so long as the structure of the resulting battery and machine does not seriously depart from the listed characteristics. It is not satisfactory, however, for one merely to write down sets of N numbers as they come to mind, since experience has shown that such patterns do not have the requisite properties of being well scattered and uncorrelated and they do not result in a battery or machine satisfying the stated required characteristics.

In another way of describing the practice of the invention, and particularly as it may be applicable to documents retrieval, each component idea is given a well scattered code pattern, indicia pattern, or code by which the intelligence conveyed by that idea is expressed upon the field of a medium, and by means of which, in cooperation with other patterns, the unit is to be selected.

The code pattern assigned to a component idea is originally derived in such a fashion that the indicia, such as marks of the pattern, are distributed in a well scattered fashion ranging over the positions of the coding field. As a consequence of this kind of distribution or dispersal of the code pattern indicia, there will be a tendency towards uniform concentration of indicia over the coding fields when there are a large number of units in the system, and a great variety of coded subjects. A minimum amount of repetition, regularity or correlation between patterns of any two component ideas is needed, and also a uniform distribution of indicia in the field on the average is required. Therefore no field position should be restricted to a single pattern. The uniform concentration of code indicia is necessary for the operation of the selection statistics. The lack of repetition, regularity or correlation is desired because distinctive codes for nearly related ideas aid in the separation of these ideas during the selection process, while codes having indicia in common will only be differentiated by those indicia that are different. A dispersal or scattering of similar patterns with respect to ideas is thus called for. If we were to examine pairs of units of the medium with each unit having several different code patterns but with one or more common code patterns in a pair, then we should desire that the frequency distribution of the number of matching or congruent indicia in the two fields of such pairs should conform statistically or should be statistically compatible with the corresponding frequency distribution of matching indicia obtained by lot. Moreover, this conformity should prevail despite the frequent occurrence of related component ideas on a unit. The scope of this invention covers the cases where the coding patterns are so used or generated, by whatever means or stratagem, that the patterns approach this ideal.

SIMPLIFIED DESIGN PRINCIPLES

This section gives additional information on how to carry out the invention by stating several simple principles which are easy to apply and which, although approximations, are approximations on the safe side. The reason why these principles lead to optimum efficiency for use of the sites of the tallies is also given. A numerical comparison of the number of sites required for a battery by the invention and when using conventional coding is given. There is example of the use of patterns having different numbers of marks. A use of the invention in signalling is described.

Optimum efficiency is demonstrated by considering first a single tally or unit of a medium having a field or matrix of F sites or positions, of which G are marked. Now if the machine or selecting device is set to select all those units that have an indicium or mark in a given position in the field, the probability of the chance selection of this one unit is G/F, which is less than one. If the selector is set up to select on the indicia in two given positions in the field chosen, the probability that the one unit will smaller selected is $(G/F)^2$; this holds true because both indicia must be present for the selection, and the probability of the simultaneous occurrence of two events (assumed here to be independent) is given by the product of the probabilities of the occurrences of the separate events. Notice that because G/F is less than 1 $(G/F)^2$ must be less than G/F. Therefore we may conclude that when the selecting apparatus is set up to select on the basis of S representative positions, the probability of the unit being selected is $(G/F)^S$, which becomes samaller as S increases.

But every code pattern for each descriptor or component idea was originally derived by lot or by a similar process. Thus the configuration of indicia in the coding field of a unit will be well scattered and uncorrelated with respect to the pattern in the selector, unless the unit bears the same component ideas as those set up in the selector apparatus. Therefore the above computation of the probability of the chance selection of any one unit will apply to the large mass of units in the collection exposed to the selector which bear no component ideas to match those set up in the selector. Thus the ratio of the number of extra units to the total number of units passed through the sorting operation will be $(G/F^S)$, assuming all the units have the same fraction of their field marked. By making S large, this ratio may be made small, and the appearance of the extra units may be controlled. In the text below, a limit will be placed on the magnitude of G/F, from which a more satisfactory expression for the ratio of extra units will result.

If the code pattern for one component idea having N indicia is placed upon the empty field of one unit of the medium, N positions in the field will be marked or otherwise designated. If the code for a second component idea with a pattern of the same length is now superimposed on the field, there is a small probability that some of the indicia from the two codes may overlap. The result is that on the average slightly less than 2N positions in the field will be designated. As the codes from more and more component ideas are added to the one coding field, this overlapping will become more frequent. Therefore G, the number of marked positions making up the indicia configuration in the field, is not simply the sum of all the indicia in the separate codes. The relation governing the average value of G may be found. Let X represent the sum of the indicia of the separate code patterns placed in the field. Then, regarding G as a function of X, the probability that a new indicium in the field will not overlap any already there is $(1 - G/F)$. From this we obtain the differential equation $$dG/dX = (1 - G/F) \tag{4}$$

with the boundary condition $G = 0$ when $X = 0$. The solution is $$G = E(1 - e^{-X/F}). \tag{5}$$

It will be noted that for small values of $X$ this is approximately $G = X$. With this solution for $G$, the expression for the ratio of extra units to all sorted units becomes $$(G/F)^S = (1 - e^{-X/F})^S \tag{6}$$

This condition for the maximum utilization of the coding field may now be found. Inspection of the above expression for the ratio of extra units reveals that the ratio increases with an increase in X, but decreases with an increase of S since the quantity in the parenthesis is always less than one. In other words, as the amount of coded intelligence impressed on the medium increases, the extra units appear more frequently, while an increase in the number of positions inspected by the selector apparatus will cut down the number of extra units. Moreover, the above expression reveals for a small X/F that X may undergo a large percentage increase and yet have no more effect on the ratio than a small percentage increase in S. But this disparity in the relative effect of X and S decreases as the fraction G/F of designated positions in the coding field increases, and in fact when G/F is near unity, or X/F is very large, the relative strength of the effect is reversed. This leads to the question: for what value of G/F are the two effects equal, or in other words, for what value will, say, a 1 percent increase in X have an effect that is just compensated by a 1 percent increase in S. Stated mathematically, the question is when will the ratio of extra units be constant at the same time $(dX/X)/(dS/S) = 1$ ? This condition can be taken as defining one choice of the optimum or maximum amount of coding that may be placed in the field. If we place more coding than this in the field, the difficulties with extra selections will increase more rapidly than advantage is gained by coding a greater amount of information. On the other hand, if we set a lower limit, we will sacrifice coding ability to an extent not compensated by the decreased ratio of extra selections. An explicit formulation of the condition may be found by differentiating the expression: $(1 - e^{-X/F})^S = \text{constant}$, regarding $X$ and $S$ as the two variables. Then by inserting $(dX/X)/(dS/S) = 1$, we obtain the relation $$G/F = (1 - e^{-X/F}) = ½ \tag{7}$$

Therefore, when one-half of the field on the average is marked, we have reached the optimum or maximum desirable utilization of the coding field in the sense defined above. This may be solved for $X$ to find the sum of the code indicia that may be expected to yield this 50 percent coverage of the field. Solving, we find $$X = 0.69\ F, \tag{8}$$

which means that the sum of the code indicia in the separate patterns may become as great as 69 percent of the number of positions in the coding field before the limiting 50 percent average coverage of the field by the indicia configuration will be exceeded. This 69 percent limit on $X$ may be taken as a limit in the amount of coding that is placed in the field. Many fields will contain less coding.

With this 69 percent limit, the average value of G/F for all the units will be no larger than one-half, and it may be significantly less. Placing one-half as a maximum value for G/F in the expression for the ratio of extra units, we can say that the ratio of extra units is less than $(1/2)^S$. This will be true so long as $X$ does not exceed the 69 percent limit.

These conclusions may be restated as principles governing many applications of the intelligence handling technique according to this invention.

First Principle

The sum of the separate indicia of the code patterns impressed on the coding field of one unit of the medium shall not exceed 69 percent of the total number of positions in the field, and in that case with well scattered uncorrelated codes, the number of designated positions in the field will average 50 percent of the positions in the field.

Second Principle

When the first principle is obeyed, in a selection on the basis of S positions in the field, the ratio of the number of extra units to the total number of units inspected will be less than $(1/2)^S$ in the average.

Not only do the two stated principles govern the allowable amount of coding on a unit and the ratio of extra units in a selection, but these principles also govern indirectly the details of the design of particular embodiments of coding systems according to the invention.

In my method of superposition coding with well scattered uncorrelated code patterns, it is possible to allow the code vocabulary to repeat. That is, the same pattern can be used for more than one component idea with no untoward results, but with the one proviso that selection must always be according to more than one component idea. The reason for this is that each of the two uses of the one pattern will probably occur among a different group of ideas or universe of discourse, and then the second component idea used in selection will cause the units bearing intelligence within its own, and therefore the proper, universe of discourse to appear. The chances for a double coincidence are very small.

When selection is made according to the teachings of this invention, the extra units appear mixed among the desired units. Of course all the units bearing the desired coding appear. But because of the extra units, the method only has utility to the extent that the desired units may be separated from the extra units. If the medium is punched cards, that is easily accomplished manually after the units are selected. On each card can be listed in plain language the several component ideas that are impressed into the coding field. By inspection of the list on each card in the pile of the selected cards, the file clerk can reject the unwanted cards. This secondary manual selection procedure is made entirely practical by holding the number of extra units to a small fraction of the total number of units in the file. For example, in a file of 100,000 units, if the selection were defined by three component ideas each having a code pattern of four marks, only 25 extra units on the average would appear in the whole search. Such is an example of the small price that is paid for the immense advantages of this new method over all conventional methods of coding.

The advantages and facilities of the present invention apply not only to stored collections of graphic or other information, but also to its use in signalling or intelligence transmission. There are two methods of signalling by way of the invention, both depending upon having a common compendium of code patterns, and component and complex ideas, at the two terminals of the signal path, and both methods making use of codes of the kind described.

By the first method of intelligence transmission, a pattern corresponding to the pattern set up in the selector device is transmitted. At the receiving point this pattern is received and recorded, and the pattern is then used to define a selection upon the intelligence-bearing units in a selectable common compendium such as a punch card file at the receiving point. The content upon the one or several units selected is the intelligence of the message transmitted. The incidence of extra selections can be reduced by transmitting selection patterns containing many marks. When there is a series of selection patterns sent, the flow of intelligence at the receiving point causes any remaining extra selections to stand out at nonsense. It is then easy to eliminate them.

By the second method of intelligence transmission, the coded field of a unit is transmitted, and at the receiving point the selector is set up to inspect the coding field for the occurrence of each of several expected patterns according to a compendium of component ideas and patterns common to the transmittal and receiving points. If such a pattern is found in the transmission, intelligence is thereby conveyed, except for the possibility of the selection being an extra unit with the consequent transmittal of a piece of spurious intelligence. However, the fact that the transmitting point emits intelligence in a connected natural sequence of words and ideas delimits the successive recognition patterns to be set up for trial, and this connected sequence of selection patterns holds the statistical probability of undetected extra selections down to vanishing. Entries in the compendium may be made to indicate allowable sequences of intelligence in order to standardize the transmission and to assist in the decoding process at the receiving end, and the transmission may begin with a conventional opening known in advance to the receiving point.

The preceding methods of signalling also constitute methods of cryptographic or secret transmission. An indication of the security of such a method may be gained from the observation that the process of superimposing codes on a field is an irreversible one. On the field the separate codes overlap, intermingle, and lose their identity. Given a pattern on a coding field, there is mathematically no unique inverse. For cryptoanalytic purposes, intelligence may be gained from a pattern only by asking it questions, that is, by inventing a set of ideas that convey a possible intelligence, coding these ideas, and then seeing if their pattern fits the transmitted pattern. These observations hold with both the methods of signalling when used as cryptographic methods.

The advantages and facilities of the preset invention apply not only to stored collections of graphic or other information, but also to its use in signalling or intelligence transmission. There are two methods of signalling by way of the invention, both depending upon having a common compendium of code patterns, and component and complex ideas, at the two terminals of the signal path, and both methods making use of codes of random origin.

It is understood of course that in signalling or intelligence transmission, the random or random-like signals may be sent by wire, by radio propagation, or that the signals so sent may be temporarily recorded on some medium such as magnetic recording tape prior to final decoding and use.

By the first method of intelligence transmission, a pattern corresponding to the pattern set up in the selector device is transmitted. At the receiving point this pattern is received and recorded, and the pattern is then used to define a selection upon the intelligence-bearing units in a selectable common compendium such as a punch card file at the receiving point. The content upon the one or several units selected is the intelligence of the message transmitted. The incidence of extra selections can be reduced by transmitting selection patterns containing many marks. When there is a series of selection patterns sent, the flow of intelligence at the receiving point causes any remaining extra selections to stand out as nonsense. It is then easy to eliminate them.

In the preceding, the selection upon the intelligence-bearing units can most generally be performed by use of the battery controlled machines herein described, of which a punch card file is a special case.

By the second method of intelligence transmission, the coded field of a unit is transmitted, and at the receiving point the selector is set up to inspect the coding field for the occurrence of expected patterns according to a common compendium of component ideas and patterns. If such a pattern is found in the transmission, intelligence is thereby conveyed, except for the possibility of the selection being an extra unit with the consequent transmittal of a piece of spurious intelligence.

This second method of intelligence transmission includes two submethods. The first submethod is the one wherein the same pattern is transmitted and retransmitted over a signalling medium to provide the signal connection from one party to the second. According to this submethod, the pattern setup in the receiving point selector or battery controlled device chooses the pattern corresponding to the particular pattern sent by the sending point. A flow of intelligence is then conveyed by means of any of the conventional means of pulse modulation (pulse frequency, pulse displacement, delta, or pulse code) wherein by this submethod, the receipt of each complete selected pattern corresponds to, and is used as, a single pulse in each of such known forms of pulse modulation and transmission. According to the statistical considerations given herein involving the extra selections of patterns, the occurrence of these extra selections can be brought to a tolerably low value in accord with the requirements of the particular mode of modulation and the purpose of the signalling.

Since this first submethod can tolerate superimposed patterns in the transmission medium, a multiplicity of sending parties may be simultaneously putting other intelligence-bearing patterns into the same transmission medium without substantial interference to the first connection, or with other similar connections.

According to the second submethod, giving slightly more complicated method of intelligence transmission, different patterns are sent by a single sending party, and the sequence of patterns which is selected is used to provide the output intelligence. This second submethod also allows the use of the same transmission medium by a multiplicity of senders and receivers, and thus there is also a possibility of the spurious selection of a misleading pattern.

However, the fact that the transmitting point emits intelligence in a connected natural sequence of words and ideas delimits the successive recognition patterns to be set up for trial, and this connected sequence of selection patterns holds the statistical probability of undetected extra selections down to vanishing. Entries in the compendium may be made to indicate allowable sequences of intelligence in order to standardize the transmission and to assist in the decoding process at the receiving end, and the transmission may begin with a conventional opening known in advance to the receiving point.

ELECTRICAL AND OPTICAL MACHINES

In order to show some of the alternative forms that the battery controlled machine of my invention may take, an electrically operated version is shown in FIG. 2. Here the input devices are keys K1, K2, etc. which when activated or closed place a positive voltage from the voltage sources 301 upon the input channel conductors 302. The linkages are in the form of unidirectional elements such as diodes or rectifiers 303, and connect to the sensing means conductors 304, and the polarities and properties of the diodes are such that only those sensing means conductors actually linked to an activated input conductor can take a voltage. The tallies 305 of the battery are conductors passing across the sensing means conductors 304, and a blank site of a tally takes another diode 306, while a marked site 307 has no connection. Each tally has an output means or indicator light 308 whereby the presence or absence of a voltage on that tally can be shown. Identification of an output tally by pattern inclusion response occurs when there is an indication of no voltage on a particular tally when one or more of the input keys are closed. Therefore, with the connections of FIG. 2, when input key K2 is pressed, light L3 stays out indicating machine response to its tally, while lights L1 and L2 go on indicating that these tallies are not outputs appropriate to K2 as input. The use of unidirectional elements 303 and 306 is necessary to prevent currents from flowing backwards in the circuits and thus giving electrically spurious output indications. In an operating machine there would of course be many more input channels, sensing means, and tallies than the three of each shown in FIG. 2 by way of illustration.

In this version of the battery controlled machine the tallies of the battery would ordinarily be a permanent part of the structure. Also, instead of diodes, relays or other means can be used to place appropriate exciting voltages first upon the sensing means conductors, and then upon the output tally conductors. Finally, in accord with the invention, the linkages and tally marks are so arranged that they have the required characteristics listed in the section "Embodiment of the Invention."

Figure 3:
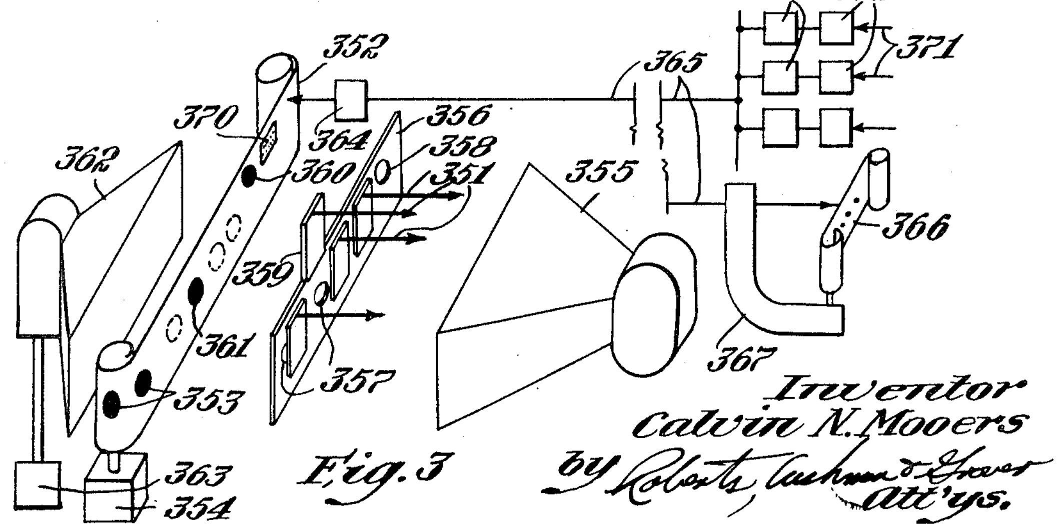
FIG. 3 is a schematic representation of an optical version of a machine of the general type of FIG. 1.

An optical version of the machine and battery is shown in FIG. 3 with an exploded view of the sensing means and battery. The sensing means rods 351 are the same as the rods 254 of FIG. 1 in the mechanical embodiment described earlier, and rods 351 are lifted in patterns according to the different descriptor inputs in the same fashion as was described earlier. Returning to FIG. 3, the battery 352 is in the form of a continuous record medium bearing appropriate marks 353, and is transported by transport means 354. A light source 335 shines light against the mask 356 having holes 357 which correspond to the sites in the mark sensing matrix and against the fiducial or indexing hole 358 which serves to find and locate the corresponding tally matrix on the machine by means of the matrix-locating fiducial mark 360. A sensing means rod 351 which is lifted as a consequence of its linkage to an actuated input channel will in turn lift an attached shutter 359 permitting light from source 355 to pass through the mask 356 to the medium 352. The medium is a transparent film except for opaque spots 353, opaque fiducial mark 360, and graphic material 370 in fixed relation to the fiducial mark. As film 352 is transported past the mask 356, all light will be blocked by the film when the tally matrix fiducial mark 360 blocks the light from fiducial hole 358 and when all marks such as 361 block the light from each hole corresponding to a lifted shutter such as 259. Upon such total blockage of light, the matrix of sites of both the tally (recorded on the medium) and of the mask 356 are in register, and there is a pattern inclusion relationship between the actuated sensing means and the tally marks. Such extinction or blockage of light is sensed by the photoelectric means 362, and an output machine response is given by the output means 363.

In another variation with such machines wherein there is a fiducial mark for each matrix, the successive matrices on the medium are allowed to overlap partially like the shingles on a roof. Because of the fiducial mark, the machine can locate each matrix and respond to it despite such overlapping. With this form of matrix overlapping, not only are the individual patterns superimposed within any one matrix, but the matrix configurations of marks are also superimposed on those matrix portions which are overlapped. By the principles of my invention, such matrix overlapping should not be allowed to cause local average densities of marked sites on the medium of greater than approximately 50 percent. The advantage of matrix overlapping is that matrices with a large number of sites can be used, and any matrix can potentially hold a large number of patterns. In the case there are only a few patterns per matrix on any section of the battery medium, the matrices can be overlapped more in this section of the medium to bring the approximate density of marks to 50 percent. When there are many patterns per matrix, a smaller degree of overlapping is used. The preferred amount of matrix overlapping is approximately inversely proportional to the number of patterns in the matrices. In this way a mark density on the medium of close to 50 percent can be achieved with a resulting optimal use of the sites in the medium.

In a fashion well known to those skilled in the art, an electronic equivalent of the machine in FIG. 3 can be constructed with a magnetic tape, for instance, forming the medium composing the battery 352 with magnetic marks in the place of optical marks, and with known electrical or electronic equivalents taking over the functions of the various mark sensing and response means. In a further useful variation, the machine and control battery is divided into a local part and a remote part. There is a remote battery medium 366 with marks and a remote battery medium transport and reading means 367 to convert the marks on the remote battery into a temporal sequence of pulses which are applied to the signal channel 365 leading to a local mark recording means 364 which applies marks to the initially blank recording medium 352 in correspondence with the marks in the remote battery. If the remote part is in the same room or building as the local part, a wire circuit can provide the signal channel 365, in other cases a radio link is provided. When the two parts of the battery controlled machine are so divided, it is essential that there be some mode of spacial to temporal translation of the marks, that is, a translation between the marks in the spacial matrix of sites on the record medium of the battery to marks in a temporal matrix of sites in the signal channel medium. Such a translation can be effected by a magnetic tape moving past reading or recording means as discussed. It can also be effected in other ways, such as by an electrical delay line wherein electrical marks in a temporal matrix are applied at one end, with electrical marks in a spacial matrix appearing at sites which are taps on the delay line, or conversely since the delay line is reversable in function. It is of course essential to the invention, in both the optical version and the electronic versions here described, that the sensing means linkages and the array of marks in the battery have the applicable physical characteristics set out in the section "Embodiment of the Invention."

The local part of the electronic version of the machine in FIG. 3, which receives pulses from a signal channel 365 for recording and machine actuation, is in fact a receiving terminal equipment for the reception of a synchronous time-multiplexed messages. In a manner well known in the communication art, voice or other signals in a multiplicity of voice channels 371 each are applied to coding means 372 to provide a pulse time representation of the voice signals, preferably by a coding of the amplitude of the voice wave into a representation by pulse repetition rate. The temporally-spaced pulses from each coding means are applied to the temporal pulse pattern generating means 373 which provides a temporal matrix fiducial mark pulse and a fixed pattern of pulses in the temporal matrix. For each pulse from a coding means 372 a temporal matrix and a pattern of pulses is generated and passed from the pattern generating means 373 into the common signal channel 365. Pulse patterns in temporal matrices from a multiplicity of sources 373 are all impressed or superimposed into the common signal channel 365, with the requirement according to my invention that pulse patterns from different sources be uncorrelated and that the average density of pulses to the available sites in the channel be not greatly in excess of 50 percent. There is not requirement for any synchronization among the various sources applying pulses to the common channel. At the local machine, which is a receiving terminal, all pulses in the common transmission channel 365 are recorded on the local battery 352. Actuation of one of the descriptor inputs to the machine then chooses which of the original voice signal channels 371 is to be responded to, since in this case a descriptor pattern in the local machine is in fact the pattern of the pulses emitted by pulse pattern generating means 373 whose voice signal is desired. Machine response occurs whenever such a pulse pattern occurs, and the machine response means 363 in this case includes a pulse-time-code to voice decoding means of one of the kinds known to the art. A number of such receiving terminal machines can be connected to and be responding from the same common channel 365 simultaneously. The physical characteristics of machine linkages and of marks recorded in the battery 352 must be in accord with the applicable characteristics listed in "Embodiments of the Invention" and with the claims in order to secure the most efficient operation.

BATTERY WITH VESTIGIAL MACHINE

In some of the most useful applications of my invention, the tally mark sensing means 254 of FIG. 1, whatever their character, are arranged manually in the battery controlled machine instead of automatically by physical linkages to actual descriptor input channels. In such a case, when a set of input descriptors is provided an operator must first convert each descriptor to its pattern of marks, he must form the superimposed pattern of the several descriptor pattern inputs, he must go to the machine and arrange the sensing means according to this superimposed pattern, and he must then cause the machine to operate by responding to the tallies of the battery according to the pattern inclusion principle. Machines of this class, which do not have the built-in input means, channels, or linkages, are called vestigial battery controlled machines. The class of such vestigial machines is very large, and includes a great many of the tabulating machines which are set up by plug boards and other card-sorting machines whose sensing elements are manually arranged and includes also simple devices used in hand sorted cards.

My invention is fully applicable to batteries of tallies appropriate to such vestigial machines, and with the use of my invention their output capabilities are greatly increased. Such improvement follows upon the construction of the battery 255 of FIG. 1c so that the marks of the tallies in the battery have the appropriate battery properties already set forth in detail in "Embodiment of Invention."

Figure 4:
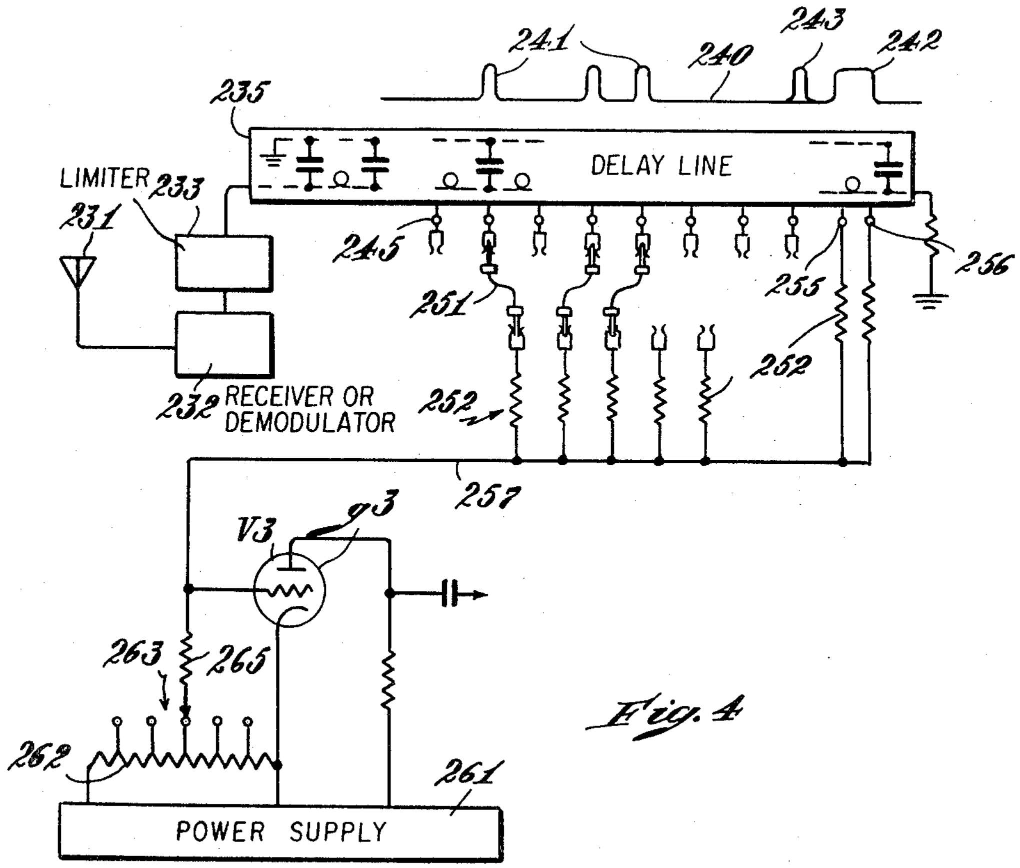
FIG. 4 is a diagram of apparatus for manipulating a code pattern in a temporal array, such as a signal in a radio or wire transmission system.

The practical application of this invention is not confined to a coded indicia configuration in a spatial configuration impressed on a material medium: it may also be applied to the case of coded indicia in a temporal array or configuration such as an electric signal in a radio transmission system or a wire circuit. FIG. 4 is an example of a selective device operating upon a medium consisting of a modulated radio carrier. The indicia are signal pulses of modulation, the indicia placement coordinate system is one of measured time intervals, and code patterns are applied in superimposition. This apparatus is useful in signalling where a recognition of a pattern of component ideas within the coded transmitted field may in itself convey intelligence according to my second described method of signalling. The apparatus may also be used in a monitor function to inspect the coded preamble of a large number of messages passing through the circuit and to cause to be recorded for human inspection and possible delivery only those few messages that bear an acceptable coded preamble, the extra selections being discarded.

It should be understood that while the specification shows the use of signals coded in the time domain, the time-and-frequency, and the time and amplitude domains and other domains can also be used for the matrix containing the transmission patterns.

The apparatus employed for this embodiment is of the type of part of that described in U.S. Pat. No. 2,415,359 to B. D. Loughlin, but its mode of use is quite different in that with my invention an aid including a compendium of component ideas and associated randomly-derived code patterns is needed in addition to the apparatus to perform a useful function.

Stated in another way, the signal receiving apparatus is arranged and used in the manner of the battery controlled device as described in this specification. Looking now to FIG. 4, the incoming radio signal is picked up by the antenna 231, whence the resulting signal is carried to the receiver 232 where the signal is demodulated. From the receiver, the demodulated signal passes through the limiter circuit 233 where the signal, which consists of a series of positive voltage pulses, has its amplitude reduced to a standard voltage value. The resulting signal, is delivered to the electrical delay line 235 which has a comparatively low velocity of propagation of signals. On such a delay line, with a suitable choice of its constants and of the time interval length of the signal which corresponds to a unit of the medium, it is possible to have the last pulse of a pulse pattern sequence entering the line before the first pulse of the sequence has reached the far end of the line. Thus the signal of voltage pulses is actually spread in transit over the length of the delay line, like water waves in a canal. In FIG. 4, this is represented schematically by the curve 240 indicating the signal arriving from the limiter, shown as it is momentarily spread over the length of the delay line 235. The signal 240 consists of pulses 241 spaced at integral multiples $n$ of the time interval $\Delta t$ from the trailing edge of the marker pulse 242 which marks the position of the beginning of a unit. Taps 245 on the delay line exhibit a voltage variation corresponding to the signal passing that point of the line. The taps 245 are spaced along the line at electrical distances corresponding to the integral time multiples from the trailing tap 255, with the exception of tap 256 which leads tap 255 by a distance corresponding to one-half $\Delta t$. Patch cords 251 provide means of connecting each of a set of selected taps 245 to one terminal of a series of buffer or isolating resistor 252, the other ends of these resistors being connected to a common lead 257 connecting to the grid of the tube V3. The two taps 255 and 256 are permanently connected through buffer resistors 252 to the common lead 257. The power supply 261, besides supplying the plate potential for the tube V3, is a grid bias voltage source. The bias voltage is supplied to grid $g3$ across the divider 262 having taps and an adjustable connection 263, and the voltage found at the connector 263 is applied to the grid $g3$ through the grid resistor 265. To set up the selection pattern, patch cords 251 are inserted at each tap on the delay line 235 to correspond to a required indicia in the selection pattern, using the tap 255 as a reference point in the coordinate system. The other end of each patch cord is connected to a different isolating resistor 252. Then the tap 263 is adjusted until the grid $g3$ of V3 is sufficiently biased that the tube will not conduct except in the case that at least each and every one of the taps on the delay line that is connected by an isolating resistor to the lead 257 is excited by a positive voltage pulse on that portion of the delay line. The result is pattern inclusion selection. An instance of such a condition for the conduction of the tube V3 is illustrated in FIG. 4, where each connected tap is excited, including necessarily the two taps 255 and 256 which have the function of detecting at what instant the signal pattern is properly positioned on the delay line. In no other position of the pattern can both taps 255 and 256 be excited since tap 256 is electrically spaced from tap 255 by only $1/2\Delta t$ and only the leading edge of pulse 242 can therefore excite tap 256 at the same time other pulses of the pattern are exciting any of the taps 245. Other pulses 243 in the indicia configuration do not effect the selection. The voltage pulses output from tube V3 resulting from selection of a signal pattern can perform several operations. It may operate a counter, or a signal bell, or it may be used to turn on a recording device to copy a message following the coded pattern that was accepted by the selecting apparatus described.

As described according to the first submethod of signalling, the output voltage pulse from tube V3 can be used as a received pulse element of some conventional system of pulse code modulation, such as pulse position modulation, pulse frequency modulation, delta modulation, and pulse code modulation to provide the intelligence-bearing output, such as voice or video.

The signals may be derived from other sources besides radio receivers. Instances of such sources are magnetic recording media, and reproducers and sound tracks film in conjunction with photoelectric scanners.

THE SIGNALLING SYSTEM

Figure 5:
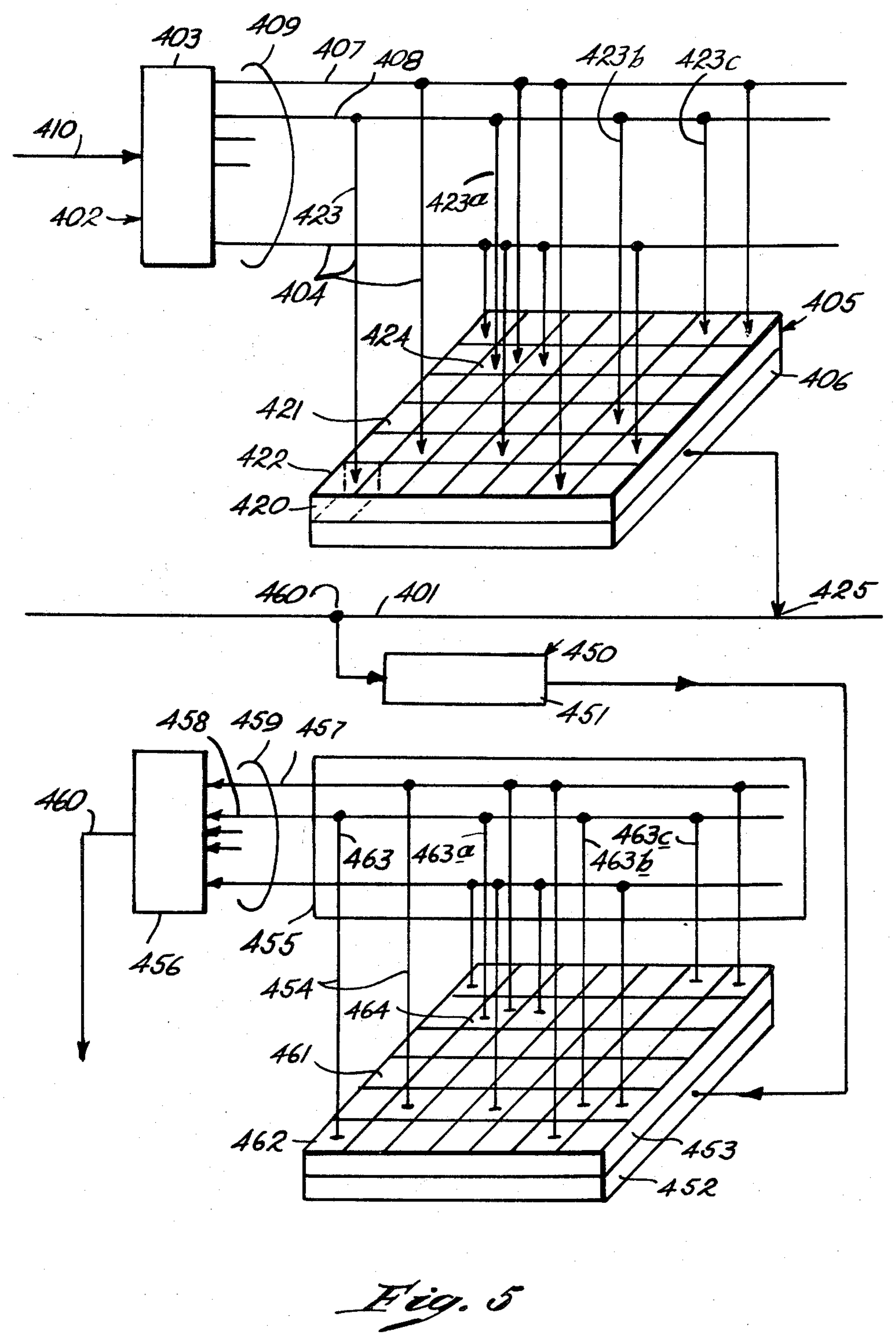
FIG. 5 is a schematic representation of an improved signalling system.

In the embodiment of the signalling system according to the invention shown in FIG. 5, there is a transmission medium 401 which may contain signal elements of a plurality of message signals from other sources, a transmission apparatus 402 including a message signal transforming means 403, activation means 404, signal element generating means 405, and signal impressing means 406. In accordance with the discussion of the invention already presented, the transmission apparatus receives an input message signal through an input channel 410 which enters the message signal transforming means 403. The message signal transforming means in general will operate on an analog signal, such as a voice signal, though it may operate on a digital data transmission signal, such as the signal from a printing telegraph.

The message transforming means is any of the many which is conventionally used in the field of pulse transmission and in related methods of transmission. For example, in one well-known method of signal transformation, the varying input voltage signal at 410 which provides the analog to the voice sound, causes recurrent pulses or actuations to be emitted, in which the recurrence rate of the pulses is in proportion to the amplitude of the instantaneous voltage. In this example, there is only one kind of actuation 407 emitted, and the information is provided on the basis of the recurrence rate of the actuation. In another well known method, called the "zig-zag," two kinds of actuations 407 and 408 are used, with a plus 407 actuation to indicate that an eventual signal reconstituting means should incrementally increase its output analog signal, while a negative actuation 408 is used to indicate that the reconstituting means should incrementally decrease its output signal. The average momentary ratio of plus to negative actuations is thus related to the slope of the eventual reconstituted and smoothed output signal. According to this method, each successive actuation depends in part on previous actuations, together with the state of the message signal. In a related method, a set of more than two actuations is used, with each successive actuation being determined jointly by one or more of the previous actuation together with the current message signal, so that the effect is to specify or delimit the allowed sequence of actuations which can be provided by the message signal transforming means. Then in the subsequent inverse transformation for providing the reconstituted output signal, the reconstituting means makes use of the specified limitations of the sequence of actuations. In another well known method, the pulse position method, the analog message signal is sampled at a fixed rate, and the actuation supplied by the message signal transformation means is displaced in time from a synchronous recurrence time or fiducial time at the sampling rate, and the displacement from the fiducial time is in proportion to the magnitude of the sampled signal voltage. In this case, each displaced actuation effectively constitutes a different kind of actuation. In still another well known message signal transformation method, the message analog signal at 410 is periodically sampled, and the magnitude of the analog signal is encoded into a short sequence of binary zeros and ones. This is the pulse code method of transformation. Typically a sequence of five binary digits may be used. Since each binary place digit is represented by a different kind of actuation, this method with five digits employs a set of 10 different kinds of actuations, and each sample is represented by five actuations chosen from this set by the transformation device.

The message transformation means, in its details, does not constitute the inventive part of this invention, and any of the conventional transformations, or variants upon them can be used. What is important for understanding is that each transformation method is characterized by having a set 409 consisting of one or more possible actuations, and the output of the transformation means is one or more actuations, e.g., 408 taken from this set. These actuations, which are the output of the message transformation means, are used in the following stages of the invention.

Message transmission is accomplished by transmission of groups of signal elements, where these signal elements are generated by the signal element generator means 405 composed of a plurality of signal element generators 420. A signal element, as understood here, is any discrete signal which can be impressed into the transmission medium of whatever sort, whether a Hertzian medium, multiple conductors of a cable, or a record medium. As previously described, signal elements in such a transmission medium are discriminable with respect to specified transmission parameters, such as frequency, time, time displacement, phase, amplitude, and so on. In particular, the discrete signal elements are discriminable with respect to intervals of such transmission parameters, and often within upper and lower limits (such as frequency limits) providing a domain of the parameters.

Accordingly, the collective set of discrimination intervals of the signal elements within the specified transmission parameter domain is representable by an array or matrix of such intervals for each of the applicable parameters. Such a matrix for representation of the parameters is shown at 421. As previously discussed, this array or matrix may have only one dimension, or two dimensions as shown, or conceptually a higher number of dimensions. A site 422 in this matrix 421 thus represents a particular set of transmission parameters suitable for transmission in the transmission medium. A site 422 accordingly also represents a possible choice of transmission parameters of a discrete signal element, as well as representing the characteristics of the signal element to be produced by a typical signal element generator 420.

A signal element generator 420 in response to actuations such as 408 is activated to generate a discrete signal element by member 423 of the activation means 404. For each actuation 408, there is a preassigned group of sites indicated by the members 423, 423a, 423b, 423c with each such site occupied by a signal element generator, such as 420. For an actuation, such as 408, each member of the group of indicated signal element generators is caused to generate a discrete signal element whose characteristic transmission parameters are represented by the location of the site in the representation matrix 421. As is indicated in FIG. 5, each actuation such as 407 of the set 409 of actuations is associated through a member such as 423 of the activation means 404 with such a preassigned group of sites, and thus with a group of signal element generators. Thus, any actuation of the set 409, or any combination of actuations of the set, will cause the generation of signal elements by the corresponding signal element generators through the mediation of the activation means 404.

It is a characteristic feature of this invention that each preassigned group of signal element generator means has a plurality of signal generators in the group. The matrix sites, and thus the transmission parameters, of the signal generating means in each group are distributed over the entire parameter representation matrix 421. Also, according to this invention, some sites may be members of more than one group, as is the case with the site 424. A signal element generating means at such a site as 424 will generate a signal element when activated according to any one or more of the groups of which it is a member. In the practice of the invention, from time to time, the transmission apparatus may be conditioned so that its signals in the medium will be selectively received at one or another different reception apparatus by altering the preassigned groups of sites of the signal element generators to some other set of predetermined groups of sites characteristic of the target reception device.

The collection of signal elements as generated are accepted by the signal impressing means 406 and are impressed into the transmission medium 401 at 425. Since the transmission medium 401 may contain a plurality of signal elements from other sources, there is the possibility that some signal elements impressed into the medium by the signal impressing means 406 may correspond to signal elements already present in the transmission medium. The nature of the signal impressing means will depend upon the nature of the signal elements being used and the nature of the transmission medium. For example if the transmission parameter domain represented by the matrix is based on the parameters time and frequency, the signal elements will be undulatory pulses at different relative times and in different frequency bands. In such case, well known methods of signal amplification and radiation by an antenna into a Hertzian medium will be performed by the signal impressing means. In other cases, other well known means will be used, as are appropriate to the transmission medium and to the transmission parameter domain employed.

In a preferred manner of practice of the invention, the density of signal elements in the medium 401, from all the source transmission devices, is held to an average value of less than 0.5, where the density of signal elements is measured with respect to the number of sites in the matrix representing the transmission parameter domain.

At the point of message reception there is a reception apparatus 450 including an extraction means 451, a transformation means 452, a representation means 453, mark sensing means 454, detection means 455, and reconstituting means 456.

The extraction means 451 senses signal elements in the transmission medium 401 at 460. Again, as in the case of the signal impressing means, the nature of the extracting means will depend upon the nature of the signal elements and the medium. With whatever choice, well known methods for such sensing and extraction are employed. In the illustrative example just cited, a reception antenna for Hertzian signals together with amplification means are employed.

The transformation means 452 takes the sensed signal elements from the extraction means 451 and forms physical representations at sites in the representation means 453. The representation means 453 is capable of physically representing by marks, such as by voltage signals on an array of conductors or on storage elements such as flip flops, indications of the presence of signal elements as provided by the transformation means 452. The representation means 453 has its sites such as 462 in a matrix 461 of intervals of the parameters of the specified transmission parameter domain. Moreover, corresponding sites of the matrix 461 of the reception apparatus and the sites of the matrix 421 of the transmission apparatus represent the same parameter intervals of the specified parameter domain used in signalling in the transmission medium. An example of a transformation means 452, with a pulse method of transmission, is a delay line which has the ability dynamically to physically separate along the delay line a temporal sequence pulse signal elements. In the same example, the representation means 453 corresponds to the set of sites which are the taps on the delay line, with the marks being the dynamic presence of a signal voltage at some of the taps of the delay line. The spaced array of taps therefore provides the representation matrix 461 of this example of reception device.

Mark sensing means 454 with members such as 463 provide the ability to sense particular sites in the matrix 461, such as site 462 for the presence of marks due to signal elements in the sites indicated by such members. More particularly, the mark sensing means 454 is arranged to sense predetermined sites for marks, such as the group of sites associated with the members **463, 463*a*, 463*b*, and 463*c* of the mark sensing means. It is seen that these members 463, 463*a*, 463*b*, and 463*c* are associated with the group of sites which are all connected with line 458 of the detection means 455. The mark sensing means will often sense sites of more than one predetermined group of sites, as in the case at site 464. Each of the predetermined group of sites is shown with members 463 of the mark sensing means 454 connected with a line such as 457 or 458** which characterizes a predetermined group. In the practice of the invention the predetermined groups of sites in the reception apparatus have the same sites as the corresponding preassigned groups of sites of the transmission apparatus. Also, in the preactice of the invention, from time to time, the reception apparatus may be conditioned to respond to some other transmission apparatus of the transmission medium by altering the set of predetermined groups of sites sensed by the mark sensing means to some other set of predetermined groups characteristic of the desired transmission apparatus.

Detection means 455 with the mark sensing means 454 allow the detection of the presence of any of the predetermined groups of marks at sites in the representation means 453. The instance of detection, such as shown by line 458, of a particular group of marks, such as at sites corresponding to members **463, 463*a*, 463*b*, and 463*c* is based upon the determination that for such group there are a specified minimum number of marks formed by the transformation means 452 in the matrix 461 of the representation means 453 for the particular group. Typically, if a predetermined group contains N marks, corresponding to N signal elements being sensed in the medium and transformed and represented in the matrix 461,** the detection means will not respond unless the mark sensing means sense the presence of N marks of a group. In some cases, as determined by the characteristics of the transmission system and medium, the detection means is adjusted so it will not respond by an instance of detection unless N−1 or some other specified minimal number of marks of a predetermined group is found to be present.

Since the transmission medium 401 is used in common by a plurality of other transmission devices, there will be signal elements from a plurality of messages in the medium. Moreover, some signal elements from the groups from the desired message may coincide. As a result, there is the possibility that the detection means may find spurious instances of detection of a group, that is a detection of a group which does not correspond to an actual instance of actuation provided by the message signal transforming means 403 of the transmission apparatus 402. As has been already described, the frequency of occurrence, or the ratio of these spurious detections can be held to a value less than a threshold value by choice of the number N of marks in a group.

In FIG. 5, the set of instances of detection 459 of the detection means 455 is shown by lines such as 457 and 458. Each of the predetermined groups of the reception apparatus are therefore associated with one of the lines such as 457, 458, etc. representing an instance of detection through the members such as **463, 463*a*, 463*b*, and 463*c* of the mark sensing means. An instance of detection 457 corresponds physically to an appropriate physical action, such as a voltage, presented to the reconstituting means 456.**

Returning to the previous illustrative example of a pulse transmission system, the mark sensing 454 with members such as 463 are conductors connected to taps of the delay line. For other representation means, other forms of mark sensing means are employed. A typical detection means 455 for this example would effectively measure or count the number of mark sensing means exposed to voltages at their taps, and when the count was above the specified number would cause an instance of detection 457 such as an output voltage or signal, on its particular connected line.

Reconstituting means 456 receive the indications of instances of detection by voltages or other indications on one or more of the lines 457, 458, etc. of the set of instance of detection 459. Except for instances of spurious detection, due to signal elements in the medium from other transmitters or groups, each indication of detection, such as 457, corresponds to a particular actuation, such as 407 of the transmission apparatus, with this correspondence following from the fact that each actuation 407 is related to a specific preassigned group of transmission apparatus matrix 421 sites, and each such group is identical to the predetermined group of reception apparatus matrix 461 sites connected through mark sensing means 454 and the detection means 455 to a particular instance of detection 457 line. Thus the set of instances of detection 459 has the same number of members as the set of actuations 409. In operation of the signalling system, the appearance of one or more actuations, such as 408, 409 at the transmission signal transformation means will eventually result, with the exception of the minor fraction of spurious responses not considered, in corresponding instances of detection such as 457, 458. Of course, in some systems of message signal transformation, the set of actuations has only one member, while in other systems, the set has two or more members.

The reconstituting means 456 reconstructs or reconstitutes an output message signal which appears in usable form on line 460. The reconstituting is performed on the basis of indications of detection, such as by 457, 458 provided by the detection means 455, with the reconstituting means 456 performing a transformation which is the functional inverse of the transformation of the message signal provided by the message signal transformation means 403 in the transmission apparatus 402. As was previously discussed, the details of the signal transformation means 403 and of the reconstituting means 456 are not a part of the present invention, and any of the many different methods and apparatus for transformation-reconstitution may be used in the practice of this invention. The only significant impact into this invention is the tolerance of particular kinds of transformation-reconstitution to spurious indications of detection, as measured by numerical error threshold ratio E, such as was already described. On the basis of such ratio, the number N of marks in a group of signal elements can be specified in the manner already set forth so that the occurrence of spurious detections and thus the deterioration of the output signal message is held within tolerable limits.

MATHEMATICAL SECTION

The improved batteries and machines of the present invention make an application of discoveries involving superimposed patterns of marks in tallies and discoveries involving the response of battery controlled machines governed by pattern inclusion selection. This section contains a detailed mathematical development of these discoveries and provides a justification and explanation of the statements or equations appearing in the section "Embodiment of the Invention" and in the appended claims.

In the following discussion, the patterns are all well scattered and uncorrelated in the precise sense defined in the section "Best Mode or Procedure for Carrying out the Invention." The matrix is either the matrix of mark sensing means or the congruent matrix of sites in the tallies of the battery. We shall first be concerned with the superimposition of $k$ different patterns each of N marks in a matrix of F sites. By definition, the superimposition of any two patterns in the matrix produces marks at each matrix site corresponding to the site of a mark in either or both of the patterns, and no marks at other matrix sites.

Consider now the probability of a specified matrix site receiving a mark from one, two, or $k$ patterns. For a single pattern, the probability is small that a mark will fall on the specified matrix site, the probability p being numerically equal to the number of marks in the pattern divided by the total number of sites, or $p = N/F$. If $k$ patterns of N marks are superimposed in the matrix, the probability that a site will have received marks from no pattern, from one pattern, and in general from M patterns is given by Q(M) which is the $M^{th}$ term of the binominal expansion of $(q + p)^k$ where $q = 1 - p$.

The first two terms Q(M) of the expansion are $$Q(0) = (1 - p)^k \text{ and } Q(1) = kp(1 - p)^{k-1}.$$

Because $p$ is small and F is generally large, these exact values of the probability given by the binominal expression converge asymptotically to the Poisson distribution given by $$Q'(M) = [e^{-kp}(kp)^M]/M! = [e^{-kN/F}(kN/F)^M]/M!$$

evaluated for integral values of M.

When patterns are superimposed in the matrix, we are concerned only with knowing whether sites are unmarked, or are marked, and the multiplicity of marking in the marked sites makes no difference. The probability of a site being unmarked is Q(0), and the probability of its being marked any number of times is 1 − Q(0). The average number of marks in a matrix is equal to the number of sites times the probability of there being a mark in a site.

Denoting the average number of marks by $G_{av}$, $$G_{av} = F(1 - Q(0)) = F(1 - (1-N/F)^k)$$

or by the Poisson approximation $$G_{av} = F(1 - e^{-kN/F}).$$

Compare with characteristic 5 listed in the section "Embodiment of the Invention."

The machine response causing ability of any tally resides completely in the marks in its matrix, and in order for any set of tallies in the battery to have the greatest input-output capability in the way of a variety of responses, the tally configurations of marks should have the greatest possible variety. The number of different configurations of G marks in a matrix of F sites is numerically equal to the number of combinations of F things taken G at a time, and the number of such combinations, and therefore the variety, is at a maximum when G is equal to F/2. Compare characteristic 6. If the average $G_{av}$ is equal to, or less than, F/2 this value can be substituted into the Poisson approximation for $G_{av}$ above, and it is found that $$-kN=F / \log_e(1/2) \text{ or}$$

$$kN / 0.69F.$$

This means that for maximum utilization of the tally, the algebraic sum of the number of marks in the tally patterns should be equal to or less than 69 percent of the number of matrix sites. This is an important principle in the use of the invention.

Turning now to the input channels of the machine, there are F mark sensing means, V input channels, and a total of L linkages between the input channels and the mark sensing means. The linkages from each input channel are arranged in a well scattered pattern, and the pattern of each such channel has a low correlation or similarity to each of the other channel patterns. Consequently the L linkages are uniformly distributed across the F mark sensing means. This being so, the average number of linkages per mark sensing means is L/F. The probability p that a linkage will occur at any of the VF intersections between the V channels and the F mark sensing means is $p = L/VF$. From this the standard deviation in the number of linkages per mark sensing means is equal to $(Vp(1 - p))^{1/2}$ or $(L/F - L^2/VF^2)^{1/2}$. These two parameters—the average and the standard deviation—give a rather complete characterization of the distribution of the number of linkages per mark sensing means. Compare characteristic 1.

A similar viewpoint can be applied to the battery of B tallies. If the $i^{th}$ site in the matrix has $n(i)$ marks, as disclosed by counting across the tallies in the battery, then the total number of marks in all the sites of all the tallies is the sum of $n(i)$ for all the $F$ sites, or $\Sigma_i n(i)$. Because each of the tallies is marked with a number of patterns, because each of the patterns has marks distributed with equal probability across all the F sites of the matrix, and because there are many different patterns in the numerous tallies of the battery, the number of marks at any site, say the $i^{th}$, is substantially the same as for any other site of the battery. Or, because $\Sigma_i n(i)$ marks are distributed with equal probability across the F sites, the number of marks in the battery for any site is approximated by $\Sigma_i n(i)/F$. The number of marks may be greater or smaller than this, but by elementary statistics, the majority of the sites will have an $n(i)$ which is within two standard deviations from the average, and since the upper bound for the standard deviation is $(B/4)^{1/2}$, the majority of the sites will have a number of marks which is within $B^{1/2}$ of the average. It is most improbable under these circumstances that any $n(i)$ could have a value in the neighborhood of zero. Thus, by similar argument from the upper limit of the standard deviation, no $n(i)$ will be less than $B^{1/2}$. Compare characteristic 3.

If the battery is divided into groups of tallies, with each group having exactly G marks in the tally matrix, then for various values of G, the numbers of tallies in the corresponding groups can be designated by R(G). Looking at it in another way, we can also say that the frequency distribution of the number of tally matrices having G sites marked is R(G). Within a group there are R(G) tallies each with G marks, or there are a total of GR(G) marks per group. For all the groups, for the various values of G, there are $\Sigma_G$GR(G) marks, which is in fact the total number of marks in the battery. By the same argument as before, the values of $n(i)$ can therefore be approximated by $\Sigma_G$(G/F)R(G). Compare with characteristic 4.

The superimposition of $k$ patterns each of N marks in a matrix of F sites does not lead to $k$N marks in the matrix because marks may overlap at some of the matrix sites. This indefiniteness in the specification of the number G of marks in the matrix would be a most unsatisfactory situation for the design of a machine and battery if it were not for our ability to provide instead a perfectly definite and exact expression for the probability distribution of G for any specified set of numbers $k$, N, and F. By way of illustration, if the number F of matrix sites is 10, and if the number N of marks per pattern is 2, then the probability distribution for the number of marked sites G is as follows:

| Number of Patterns superimposed | Probability distribution of G | | | | | | | | |
|---|---|---|---|---|---|---|---|---|---|
| | G = 0 | 1 | 2 | 3 | 4 | 5 | 6 | 7 | etc. |
| $k = 1$ | 0 | 0 | 1.000 | 0 | 0 | 0 | 0 | 0 | |
| 2 | 0 | 0 | .022 | .356 | .622 | 0 | 0 | 0 | |

| | | | | | | | | |
|---|---|---|---|---|---|---|---|---|
| 3 | 0 | 0 | .001 | .032 | .263 | .497 | .207 | 0 |

According to this distribution, if we were to superimpose three random patterns at a time ($k = 3$), and if we did this 1,000 times, then the most likely number of marked sites would be 5, and this would occur in approximately 497 out of the 1,000 trials. We also see that because of the overlapping that would occur, only in approximately 207 out of the 1,000 trials would the three patterns of six marks each give G = 6 marks. Therefore it is seen that such a table for the probability distribution for G provides a very complete specification of the consequences of superimposing random patterns in a matrix, and provides it in a form frequently used in current engineering practice. We define P(G;F,$k$N) for the various values of G to be the probability distribution of the number of marked sites G in a matrix of F sites when $k$ well scattered and uncorrelated patterns each of N marks are superimposed.

The operation of superimposition of two such patterns U and V defined in a matrix of F sites is actually equivalent to the operation of union or addition in the Boolean algebra whose elements are the subsets of F things. Compare Chapter XI of "A Survey of Modern Alegbra" by Birkhoff and MacLane, MacMillan, New York, 1944. We shall indicate the superimposition of the two patterns by U # V. On the other hand, if $k$ patterns each of exactly N marks are superimposed, we shall indicate the resulting superimposed pattern by $k$N. The Boolean complement of a pattern U, which is denoted by U, is the pattern whose marks occur at sites of blanks in pattern U, and vice versa. The Boolean product or intersection of patterns U and V, denoted by U & V, is the pattern of sites at which both U and V have marks, or the sites at which the marks of pattern U match the marks of pattern V.

The probability distribution function P(G;F,$k$N) will now be derived. For convenience, let the binominal coefficient which represents the number of ways of taking a things b at a time be indicated by $$\binom{a}{b}=\frac{a}{b!(a-b)!}$$

When a single pattern X having $x$ marks is placed in a matrix of F places, P(G;F,X) = 0 for all values of G not equal to $x$, and = 1 for G equal to $x$. When a second pattern $y$ marks is superimposed upon X, the number of different ways that $z$ new marks can fall into the sites not marked by X, there being F − $x$ unmarked sites, is exactly $$\binom{F-x}{z}$$

and the number of different ways that the remaining $y - z$ marks can fall into the $x$ already marked sites is $$\binom{x}{y-z}$$

Therefore, when pattern Y is superimposed upon pattern X, the probability that exactly $z$ new places are marked is $$\frac{\binom{F-x}{z}\binom{x}{y-z}}{\binom{F}{y}}$$

where the term in the denominator represents the total number of ways that $y$ marks can be placed in the matrix of F sites without any constraints.

The total number of sites marked is $G = x + z$, so eliminating $z$ in the last expression, we define $$J(G;\, F,\, x,\, y)=\frac{\binom{F-x}{F-G}\binom{x}{G-y}}{\binom{F}{y}}$$

which is in fact the special case of the probability distribution due to the superimposition of two patterns each having exactly $x$ and $y$ marks in their individual patterns. In other words, J(G;F,$x$,$y$) = (P(G;F,X # Y) for the two patterns X and Y.

If we were to superimpose a third pattern Z into the matrix along with X # Y, we can no longer assume that we know the specific number of marked sites for the pattern X # Y. However, we do now the exact probability distribution function of G for the pattern X # Y, and from this we can in turn compute the probability distribution function of G for X # Y # Z.

More generally, if we superimpose two configurations of marks U and V for which only the probability distributions are known, we should like to be able to compute the probability dis-tribution of G for U # V. This can be done by use of the special function J(G;F,$x$,$y$) as will now be demonstrated. The probability distribution of U is represented by P(G;F,U), and that of V by P(G;F,V). Consequently the probability that pattern configuration U has exactly 12 positions marked is P(12;F,U), while the probability that V has exactly 8 marked is P(8;F,V). In the superimposed or Boolean sum U # V, these two probabilities will contribute to the final distribution P(G;F,U # V) for all values of G ranging between 8 and 20, and the factor of proportionality to adjust the relative magnitudes of these contributions is precisely J(G;F,12,8). Therefore, these two probabilities contribute an amount equal to J(G;F,12,8)P(12;F,U)P(8;F,V) to the distribution P(G;F,U # V) for G ranging from 8 to 20.

The same thing can be done for other G values for U and V, each time getting a contribution. When all these contributions are summed the result is $$P(G;F,U\#V)=\sum_{x}\sum_{y}J(G;F,x,y)P(x;F,U)P(y;F,V)$$

where in this case $x$ and $y$ are simple variables in the summation standing for the G values for U and V.

This important general result allows us to compute exactly the probability distribution function of G for the superimposition of any two configurations of marks in the matrix whenever the probability distribution functions of the individual patterns are known. As a special case, for $k$ patterns of exactly N marks each, we can compute the probability distribution P(G;F,N # N) for two patterns, then use this to compute P(G;F,N #N#N) = P(G;F,3N) for three patterns, and so on for any value of $k$. This is exactly the computational procedure that was followed to compute P(G;10,*k*N) for N = 2 in the illustrative table above. Also, compare characteristics 2 and 5.

The exact value for the means of the distribution P(G;F,kN), that is for the average value of G denoted by $G_{av}$, has already been derived and is $G_{av} = F(1-(1-N/F)^k)$. The central limit theorem (Cf. page 213, "Mathematical Methods of Statistics" by Cramer, Princeton University Press, Princeton, 1946) applies to P(G;F,*k*N) for F large and *k*N within a suitable range less than F. Therefore by this theorem, P(G;F,*k*N) takes on a "normal distribution." By De Moivre's theorem (Cf. Cramer page 214) this asymptotic normal distribution has the mean value $G_{av}$ and the standard deviation $D = (G_{av} - G^2_{av}/F)^{1/2}$. Therefore for many purposes for design and engineering in connection with the present invention, the approximation $$P(G:F,kN) = \frac{1}{D\sqrt{2}} e^{-\frac{1}{2}\left(\frac{G-G_{av}^2}{D}\right)}$$

can be used.

For a general configuration U with P(G;F,U), the Boolean complement U has the probability distribution P(G;F,U) = P(F–G;F,U). The Boolean product or intersection of configurations U and V, denoted by U & V, is also definable in terms of complementation and union. That is $$U \,\&\, V = \overline{\overline{U} \;\#\; \overline{V}}\,.$$

By use of this relationship, the probability distribution of U & V can be derived from the separate distributions for U and V. By simple substitution and by making use of the expression for the distribution of the complement, we have $$P(G;F,U\&V) = \sum_x \sum_y J(F-G;F,x,y) P(F-x;F,U)P(F-y;F,V).$$

The response of the battery controlled machine is governed by pattern inclusion sensing and response. If the pattern of actuated sensing means has S members, each of these must meet a mark on the matrix of the responded to tally. If the tally has the probability distribution P(G;F,U) for its configuration of marks U, then the number G of sensing means which meet a mark in the configuration U has a distribution in G given by P(G;F,U&S).

In the more general response situation, we only know that k descriptor inputs each with a pattern of N marks actuate the battery controlled machine, and that the battery is characterized by the frequency distribution R(G) for the number of tally matrices bearing G marks apiece. Consider first a selective configuration S with distribution P(G;F,S) operating with respect to a single tally matrix with configuration U and distribution P(G;F,U). A variety of values of G in P(G;F,S&U) will this time allow a possible response, with the probability of a response for any particular value of G being weighted according to the distribution of P(G;F,S). That is, for any particular value of G, the probability of response of this tally is P(G;F,S)P(G;F,S&U). The total probability of response for all values of G is $$\sum_G P(G;\, F,\, S)P(G;\, F,\, S \,\&\, U).$$

We can replace P(G;F,S) by P(G;F,kN) for the input of *k* patterns of N marks each. The second factor in this summation expands to $$\sum_x \sum_y J(F-G;\, F,\, x,\, y)P(F-x;\, F,\, kN)P(F-y;\, F,\, U).$$

The factor *P(F–y;F,U)* applies only to one tally. To make our computation applicable to the entire battery with the frequency distribution *R(G)*, we replace the factor *P(F–y,F,U)* by *R(–y)*. Combining, the result is the expected number E of extra responses from the battery characterized by R(G) and from an input of *k* patterns of N marks, and $$E:\sum_G \sum_x \sum_y P(G;\, F,\, kN)J(F-G;\, F,\, x,\, y) P(F-x;\, F,\, kN)R-F(y).$$

In the design of a battery controlled machine, an exact knowledge of the number E of extra responses is seldom required. It is generally sufficient to be able to find an upper limit for the magnitude of E, and we can do this as follows. According to optimum design of the battery, the average number of sites marked per matrix will be F/2 or less. Assume that all tallies have exactly F/2 sites marked, that is, one half of all tally sites in the battery are marked. If the machine has only one actuated mark sensing means, then evidently with B tallies in the battery some B/2 will give a spurious response. This is so because the marks of the tallies are well scattered, and for each tally there is a one half chance that it will have a mark at the position of the sensing means. If there are two mark sensing means, the number of spuriously responding tallies is cut to B/4; and in general if there are S actuated mark sensing means, the number of spurious tallies is approximated by $B(1/2)^S$. If the machine input is made up of *k* patterns of N marks each, whose superimposition makes up the sensing pattern S, certainly the number of marks of S will equal to or less than *k*N. Therefore, an upper limit for E is provided by $B(1/2)^{kN}$. This upper limit is a conservative approximation because many tallies will have fewer than F/2 marked sites and because the number of marks of S is smaller than *k*N. Compare characteristic 8.

If the input descriptors are not assigned random patterns, but instead are assigned patterns which have a similarity or correlation of marks at corresponding sites, the operation of the battery and machine will be much inferior to that obtained by the invention. It is possible to test a battery for such unwanted correlation by taking groups of pairs of tallies wherein the tallies of each pair are responsive to the same descriptor pattern, and by empirically counting the distribution of matching marks of such tally pairs. If this empirically obtained distribution of a battery departs significantly from the theoretical distribution for random patterns, it can be concluded that the battery is not according to the invention. The distribution for matching marks for such tally pairs will now be derived. For simplicity we shall assume all the patterns have N marks. If the pairs are so chosen that they each are responsive to $k + 1$ patterns, of which one pattern of the pair is the same for both tallies, the configuration of marks in the matrix of the first tally can be indicated by N* # *k*N and that message signal transforming means to transform a message signal into actuations from a set of actuations to represent the message signal, where said message signal transforming means performs the inverse transformation to said reconstituting means;

signal element generator means to generate discrete signal elements whose transmission parameters are represented by sites in a transmission matrix, where sites in said transmission matrix correspond to the same intervals of parameters as the sites in said matrix of said reception apparatus;

activation means for responding to said actuations from said signal transforming means and for causing said signal element generator means to generate preassigned groups of signal elements, with each group of signal elements being associated with an actuation, with each group having a plurality of signal elements, and with the matrix sites of each group being the same as the matrix sites of a corresponding said predetermined group of said reception apparatus; and signal impressing means for impressing said generated signal elements into said transmission medium irrespective of other signal elements in the medium, with the possibility of some impressed signal elements corresponding to signal elements already present in the transmission medium.

6. In a signalling system with a transmission medium containing signal elements of a plurality of messages, transmission apparatus comprising:

message signal transforming means to transform a message signal into actuations from a set of actuations to represent the message signal;

signal element generator means to generate discrete signal elements;

activation means for responding to said actuations and for causing said signal element generator means to generate predetermined groups of signal elements, with each group having a plurality of signal elements, with the signal parameters of the signal elements for a group being distributed over a set of parameter intervals of a specified transmission parameter domain; and signal impressing means for impressing said generated signal elements into said transmission medium irrespective of other signal elements in the medium, with the possibility of some impressed signal elements corresponding to signal elements already present in the transmission medium.

7. Transmission apparatus of claim 6 wherein N represents the integer number of discrete signal elements in a said group, the said transmission apparatus being for use in conjunction with a reception apparatus having a threshold value E for the ratio of spurious selections of a group when detection of a group is based on the determination of the presence of a specified minimal number N−J signal elements of a group, the total density of signal elements in the medium on the average not exceeding 0.5; and wherein said transmission apparatus is characterized by the number N being restricted to a value such that the expression $$[N(N-1)(N-2) \ldots (N-J+1)(1/2)^{N-J}]/[(1)(2)(3) \ldots (J)]$$

has a value less than or equal to E.

8. Transmission apparatus of claim 7 wherein J = 0 and N is restricted to a value such that the expression $(1/2)^N$ has a value less than or equal to E.

9. In a signalling system with a transmission medium containing a plurality of messages, transmission apparatus comprising:

message signal transforming means to transform a message signal into actuations from a set of actuations to represent the message signal;

signal element generator means to generate discrete signal elements whose transmission parameters are represented by sites in a transmission matrix, where sites in said transmission matrix correspond to intervals of parameters of a specified transmission parameter domain;

activation means for responding to said actuations from said message signal transforming means and for causing for each actuation a preassigned group of signal element generator means to generate signal elements, with each group being associated with a specific actuation, with each group having a plurality of signal element generating means, and with the sites of the signal generating means for each group being distributed over the transmission matrix;

signal impressing means for impressing said generated signal elements into said transmission medium irrespective of any other signal elements in the medium from other messages;

in combination with reception apparatus comprising:

extraction means for sensing signal elements in said specified transmission parameter domain of the medium;

representation means for physically representing signal elements with marks at sites in a reception matrix, with said sites corresponding to intervals of parameters of said specified transmission parameter domain, with the sites of the reception matrix and sites of the transmission matrix representing the same transmission parameter intervals;

signal element transformation means for transforming said sensed signal elements and for forming representative physical marks at sites in said reception matrix;

mark sensing means for sensing sites in said reception matrix for predetermined groups of marks, with the sites of said predetermined groups corresponding to the sites of said preassigned groups of signal element generator means;

detection means with said mark sensing means for detecting the presence of any of said predetermined groups of marks, with the instance of detection of a group being based upon the determination that there are a specified minimum number of said formed marks at sites in the reception matrix for the detected group, with the set of instances of detection of the predetermined groups of marks corresponding to the set of actuations of groups of signal generating means at the transmission apparatus; and reconstituting means for reconstituting an output message signal from said instances of detection with the reconstituting means performing a transformation which is the functional inverse of the transformation of the message signal transforming means.

of the second tally also by N* # $k$N, where the asterisk indicates the common patterns, all the other patterns being different. The configuration of corresponding or matching marks is given by (N* # $k$N) & (N* # $k$N) which, by Boolean algebraic principles, equals the expression N* # ($k$N&$k$N), or now dropping the asterisk, equals N # ($k$N&$k$N). Therefore, the distribution is given by P(G;F,N # ($k$N&$k$N)) which can be computed stp by step in the manner shown earlier. Compare characteristic 7.

The computations so far have all applied to undivided matrices of F sites. In many instances it is expedient to partition the matrix into submatrices of F′,F″, etc. sites per submatrix, and to place marks from each pattern in each submatrix. When such is the case, the preceding computations are carried out for each submatrix separately to obtain the distributions within each submatrix. The resulting submatrix distributions are combined according to the rule $$P(G;\, F'+F'',\, U)=\sum_t P(t;\, F',\, U)P(G-t;\, F'',U),$$

and when there are more than two submatrices the rule is applied repeatedly to accumulate the contribution from each submatrix.

For specified input-output performance, a battery and machine requires at least a certain minimal number F of sites in its matrix. Consider a machine with B tallies designed to be responsive to as many as $k_2$ simultaneous input descriptor patterns, but which must not produce more than an average of E extra responses when there are only $k_1$ inputs. We can derive the relationship between the quantities B, $k_1$, $k_2$, E, and F through the use of the approximations developed in the preceding paragraphs. From $E = B(1/2)^{k}1^{N}$ we obtain $N = (1/k_1)\log_2(B/E)$ for the minimal number of marks in the pattern. Since N must be integral, we choose N′ to be the least integer which is equal to or greater than $(1/k_1)\log_2(B/E)$. The maximal number $k_2$ of patterns must not overload the matrix sites, so $k_2N' = F(\log_e 2)$, or $F = k_2(\log_2 e)N'$. Therefore by multiplying the integer N′ by $k_2(\log_2 e)$ we obtain the necessary number of sites F in the matrix of mark sensing means for providing the specified performance; compare characteristic 9.

It should be understood that the present disclosure is for the purpose of illustration only and that this invention includes all modifications and equivalents which fall within the scope of the appended claims.

I claim:

1. In a signalling system with a transmission medium containing signal elements of a plurality of messages, reception apparatus comprising:

extraction means for sensing signal elements in said transmission medium in a specified transmission parameter domain of the medium;

transformation means for forming discrete physical representations for said sensed signal elements according to a set of parameter intervals of said transmission parameter domain;

detection means for detecting instances of presence of predetermined groups of said formed representations, with each group being specified by a plurality of said representations distributed over the said set of intervals, and with the detection of a group being based upon the determination of the presence of a specified minimal number of representations of the group, with the possibility of some instances of detection of a group being spurious due to the presence of signal elements from other groups or messages in the transmission medium, with the ratio of spurious detections being held to a value less than a threshold value by choice of the number of representations in a group; and reconstituting means for reconstituting a message output signal by using the instances of detection of said predetermined groups and by performing a transformation which is the functional inverse of the transformation performed on the original message signal.

2. Reception apparatus of claim 1 wherein N represents the integer number of representations in a said group, N-J represents the said specified minimal number, the density of signal elements in said medium on the average not exceeding 0.5; and wherein the said reception apparatus is characterized by the said ratio of spurious detections for said group being held to a value less than a threshold ratio value E by restricting the number N to a value such that the expression $$[N(N-1)\,(N-2)\ldots(N-J+1)\,(1/2)^{N-J}]/[(1)(2)(3)\ldots(J)]$$

has a value less than or equal to E.

3. Reception apparatus of claim 2 wherein J = 0 and N is restricted to a value such that the expression $(1/2)^N$ has a value less than or equal to E.

4. In a signalling system with a transmission medium containing signal elements of a plurality of messages, reception apparatus comprising:

extraction means for sensing signal elements in a specified transmission parameter domain of the transmission medium;

representation means for physically representing signal elements with marks at sites in a matrix representative of intervals of the parameters of said transmission parameter domain;

transforming means for transforming said sensed signal elements and forming representative marks at sites in said matrix;

mark sensing means for sensing sites for predetermined groups of marks in said matrix with each group having a plurality of marks distributed over the matrix.

detection means with said mark sensing means for detecting the presence of any of said predetermined groups of marks in the matrix, with the instance of detection of a group being based upon the determination that there are a specified minimal number of formed marks at sites in the matrix for a detected group, with some instances of detection of a group being spurious due to the presence of marks from signal elements of other groups or messages in the transmission medium, with the ratio of spurious detections being held to a value less than a threshold value by choice of the number of marks in a group; and reconstituting means for reconstituting a message output signal from the instances of detection of said predetermined groups.

5. The reception apparatus of claim 4 in combination with transmission apparatus which includes:

10. The apparatus of claim 9 wherein said actuations produced by said message signal transforming means are restricted to specified sequences of actuations.

11. In a signalling system with a transmission medium containing signal elements of a plurality of messages, the reception method characterized by the steps of:

forming a discrete physical representation for each signal element present in a specified transmission parameter domain of the medium according to a specified set of parameter intervals in said domain, detecting the instances of predetermined groups of said formed physical representations where each of said groups is specified by a plurality of physical representations distributed over said set of parameter intervals and where detection of a group is based upon the determination that there are present a specified minimal number of said formed physical representations of the detected groups with some instances of detection of a group being spurious due to the presence of signal elements from other groups or messages in the transmission medium and with the ratio of spurious detections being held to a value less than a threshold value by choice of the number of said physical representations in a group, and reconstituting a message output signal from said instances of detection of said predetermined groups with the reconstituting means performing a transformation which is the functional inverse of the transformation performed on the original message signal.

12. The method according to claim 11 wherein said predetermined groups differ only with respect to the magnitude of a particular transmission parameter, and wherein reconstitution of the message output signal is based upon the magnitudes of the said particular transmission parameter for the detected groups.

13. In a signalling system with a transmission medium containing signal elements of a plurality of messages, the method characterized by the steps of:

conditioning a transmission apparatus for generation of a particular set of groups of signal elements, with each group having a plurality of signal elements, with the transmission parameters of the individual signal elements from each group being distributed over a set of intervals of a specified transmission parameter domain of the transmission medium, and with each group of signal elements corresponding to one actuation of a set of actuations in the transmission apparatus;

transforming a message signal into actuations from said set of actuations to represent the message signal;

generating signal elements for groups corresponding to the actuations representative of said message signal;

impressing said signal elements into the medium irrespective of any other signal elements in the medium with the possibility of some impressed signal elements corresponding to signal elements already present in the transmission medium;

conditioning a reception apparatus for said particular set of groups of signal elements;

forming at the reception apparatus a physical representation for each signal element in the medium in the specified transmission parameter domain for all the messages, with said physical representations being formed according to said set of intervals of said domain;

detecting the instances of presence of groups from said particular set of groups, where detection of a group is based upon the determination that there are a specified minimal number of said formed physical representations for each detected group, with the possibility of some instances of detection of a group being spurious due to the presence of signal elements from other groups or messages in the transmission medium, with the ratio of spurious detections being held to a value less than a threshold value by choice of the number of signal elements in a group; and reconstituting a message output signal from said instances of group detection by performing a transformation which is the functional inverse of said transformation of the message signal.

* * * * *